US010426129B2

(12) United States Patent
Nelles et al.

(10) Patent No.: US 10,426,129 B2
(45) Date of Patent: Oct. 1, 2019

(54) CHEESE-MAKING METHODS AND APPARATUSES

(71) Applicant: Tetra Laval Holdings & Finance S.A., Pully (CH)

(72) Inventors: Peter F. Nelles, Blue Mounds, WI (US); Gary L. Nesheim, Delafield, WI (US); Grant L. Nesheim, Mazomanie, WI (US)

(73) Assignee: Tetra Laval Holdings & Finance S.A., Pully (CH)

( * ) Notice: Subject to any disclaimer, the term of this patent is extended or adjusted under 35 U.S.C. 154(b) by 250 days.

(21) Appl. No.: 14/553,464

(22) Filed: Nov. 25, 2014

(65) Prior Publication Data
US 2015/0147443 A1 May 28, 2015

Related U.S. Application Data

(60) Provisional application No. 61/909,794, filed on Nov. 27, 2013, provisional application No. 61/982,013, filed on Apr. 21, 2014.

(51) Int. Cl.
*A23C 19/068* (2006.01)
*A01J 25/00* (2006.01)
*A23C 3/07* (2006.01)
*A23C 19/06* (2006.01)
*A23L 5/30* (2016.01)

(52) U.S. Cl.
CPC .............. *A01J 25/008* (2013.01); *A23C 3/07* (2013.01); *A23C 19/06* (2013.01); *A23C 19/0684* (2013.01); *A23L 5/34* (2016.08)

(58) Field of Classification Search
CPC ....... A23C 19/0684; A23C 3/07; A23C 19/06; A23L 1/0255; A23L 5/34; A01J 25/008
See application file for complete search history.

(56) References Cited

U.S. PATENT DOCUMENTS

| 140,527 A | 7/1873 | Munson, Jr. |
| 923,047 A | 5/1909 | Hanna |
| 1,639,826 A | 8/1927 | Wheeler et al. |
| 1,713,637 A | 5/1929 | Aaron |
| 1,796,445 A | 3/1931 | Doering et al. |
| 1,861,721 A | 6/1932 | Scott |
| 2,321,185 A | 6/1943 | Christian |

(Continued)

FOREIGN PATENT DOCUMENTS

| EP | 0124163 A | 11/1984 |
| EP | 0186795 A | 7/1986 |

(Continued)

OTHER PUBLICATIONS

International Preliminary Report on Patentability for PCT/US2013/074969 dated Jun. 16, 2015, 33 pages.

(Continued)

*Primary Examiner* — Steven N Leff
(74) *Attorney, Agent, or Firm* — Knobbe, Martens, Olson & Bear, LLP

(57) ABSTRACT

The disclosure relates to methods and apparatuses for the production of cheese. In one embodiment, the disclosure relates to methods and apparatuses for making pasta filata cheese. In one embodiment a tube within a tube design is used for the production of pasta filata cheese.

15 Claims, 4 Drawing Sheets

(56) References Cited

U.S. PATENT DOCUMENTS

| | | |
|---|---|---|
| 2,733,148 A | 1/1956 | Russo |
| 2,781,269 A | 2/1957 | Harper et al. |
| 2,840,909 A | 7/1958 | Dzenis |
| 2,883,163 A | 4/1959 | Solheim |
| 2,908,575 A | 10/1959 | Spiess, Jr. et al. |
| 3,310,836 A | 3/1967 | Nichols |
| 3,394,011 A | 7/1968 | Richardson et al. |
| 3,529,661 A | 9/1970 | Yousch |
| 3,529,939 A | 9/1970 | Mason |
| 3,548,926 A | 12/1970 | Archer |
| 3,616,747 A | 11/1971 | Lapeyre |
| 3,637,069 A | 1/1972 | Christian et al. |
| 3,688,837 A | 9/1972 | Ocker |
| 3,713,220 A | 1/1973 | Kielsmeier et al. |
| 3,899,596 A | 8/1975 | Stenne |
| 3,961,077 A | 6/1976 | Kielsmeier |
| 3,970,113 A | 7/1976 | Guttinger et al. |
| 4,039,691 A | 8/1977 | Hildebolt |
| 4,091,721 A | 5/1978 | Cosmi |
| 4,112,131 A | 9/1978 | Bosy et al. |
| 4,116,164 A | 9/1978 | Shabi et al. |
| 4,541,329 A | 9/1985 | Mongiello |
| 4,592,274 A | 6/1986 | Tomatis |
| 4,608,261 A | 8/1986 | MacKenzie |
| 4,622,228 A | 11/1986 | Ikeuchi et al. |
| 4,723,901 A | 2/1988 | Sarumaru |
| 4,848,219 A | 7/1989 | Aldrovandi |
| 5,120,559 A | 6/1992 | Rizvi et al. |
| 5,165,948 A | 11/1992 | Thomas |
| 5,350,595 A | 9/1994 | Hockenberry et al. |
| 5,358,730 A | 10/1994 | Dame-Cahagne et al. |
| 5,408,074 A * | 4/1995 | Warmbier ............... H05B 6/78 219/701 |
| 5,514,853 A | 5/1996 | Le Viet |
| 5,547,277 A | 8/1996 | Caspelherr et al. |
| 5,595,775 A | 1/1997 | Tishel |
| 5,697,291 A * | 12/1997 | Burgener ............... A23L 2/48 165/65 |
| 5,750,177 A | 5/1998 | Yee et al. |
| 5,792,500 A | 8/1998 | Housset et al. |
| 5,802,961 A | 9/1998 | Hay et al. |
| 5,906,853 A | 5/1999 | Smith |
| 5,942,263 A | 8/1999 | Chen et al. |
| 5,945,022 A | 8/1999 | Volpe et al. |
| 5,952,030 A | 9/1999 | Nelles et al. |
| 5,967,026 A | 10/1999 | Nelles et al. |
| 5,996,475 A | 12/1999 | Smith |
| 6,086,926 A | 7/2000 | Bruce et al. |
| 6,120,809 A | 9/2000 | Rhodes |
| 6,180,153 B1 | 1/2001 | Palus et al. |
| RE37,264 E | 7/2001 | Chen et al. |
| 6,319,526 B1 | 11/2001 | Dahlstrom et al. |
| 6,524,632 B2 | 2/2003 | Kartchner |
| 6,780,445 B1 | 8/2004 | Rhodes |
| 6,989,170 B2 | 1/2006 | Konanayakam et al. |
| 7,291,356 B2 | 11/2007 | Merrill et al. |
| 7,521,076 B1 | 4/2009 | Wenger et al. |
| 7,550,279 B2 | 6/2009 | Nickel |
| 7,579,033 B2 | 8/2009 | Merril et al. |
| 7,582,323 B2 | 9/2009 | Aird et al. |
| 7,585,537 B2 | 9/2009 | Merril et al. |
| 7,651,715 B2 | 1/2010 | Merril et al. |
| 7,666,458 B2 | 2/2010 | Merril et al. |
| 7,713,564 B2 | 5/2010 | Merril et al. |
| 7,955,814 B2 | 6/2011 | Dekreij et al. |
| 7,976,886 B2 | 7/2011 | Merril et al. |
| 7,987,774 B2 | 8/2011 | Wenger et al. |
| 8,021,704 B2 | 9/2011 | Merril et al. |
| 8,221,816 B1 | 7/2012 | Leffelman |
| 8,241,691 B2 | 8/2012 | Merril et al. |
| 8,603,554 B2 | 12/2013 | Merril et al. |
| 8,613,970 B2 | 12/2013 | Merril et al. |
| 8,628,810 B2 | 1/2014 | Barbano et al. |
| 8,932,657 B2 | 1/2015 | Nelles et al. |
| 2004/0076736 A1 | 4/2004 | Konanayakam et al. |
| 2005/0249853 A1 | 11/2005 | Merrill et al. |
| 2008/0089987 A1 | 4/2008 | Horn |
| 2008/0131557 A1 | 6/2008 | Isse et al. |
| 2008/0179318 A1 | 7/2008 | Cornwell |
| 2010/0051233 A1 | 3/2010 | Whitney et al. |
| 2010/0209584 A1 | 8/2010 | Weibel |
| 2010/0239713 A1 | 9/2010 | Merrill et al. |
| 2011/0091627 A1 | 4/2011 | Wenger et al. |
| 2012/0097048 A1 | 4/2012 | Tomatis |
| 2014/0027095 A1 | 1/2014 | Warchol et al. |
| 2014/0037812 A1 | 2/2014 | Oxbell et al. |
| 2015/0296739 A1 | 10/2015 | Nelles et al. |
| 2016/0243727 A1 | 8/2016 | Nelles et al. |

FOREIGN PATENT DOCUMENTS

| | | |
|---|---|---|
| JP | 07143844 | 6/1995 |
| WO | WO9409615 A | 5/1994 |
| WO | WO9953749 | 10/1999 |

OTHER PUBLICATIONS

International Search Report and Written Opinion for PCT/US2013/074969 dated Mar. 24 2014, 10 pages.

Sam Caddeu, "Using Microwave Techniques in the Production of Mozzarella Cheese," Proceedings From the Second Biennial Marschall International Cheese Conference, Sep. 15, 1981, pp. 176-179.

\* cited by examiner

CHEESE-MAKING METHODS AND APPARATUSES

CROSS REFERENCE TO RELATED APPLICATIONS

This application claims priority to and is a non-provisional application of U.S. Provisional Application No. 61/909,794 files Nov. 27, 2013, and U.S. Provisional Application No. 61/982,013 filed Apr. 21, 2014; the entirety of both applications are hereby incorporated by reference.

FIELD

The disclosure related to methods and apparatuses for the production of cheese. In one embodiment, the disclosure relates to methods and apparatuses for making pasta filata cheese. In one embodiment, the disclosure relates to a tube-within-a-tube design for making pasta filata cheese.

BACKGROUND

Recently there has been an increase in the demand for cheeses that have widely differing performance characteristics. This particular demand is driven in part by the increasing variety of prepared foods in which such cheeses are included. In fact, there often is a need for different performance qualities even for foods of the same general type because of the different ways cheeses are utilized or because the cheese is exposed to differing cooking environments or conditions. Pizzas illustrate this point well because there are so many different types of pizzas. Pizzas, for example, have widely differing crusts, including thick, thin, or somewhere in between. The cheese can also be exposed or wrapped in the edge of the crust. Furthermore, the crust may be completely uncooked or it may be part-baked before being put in the oven with the cheese. Each of these variables potentially impacts the composition of the cheese required to provide satisfactory performance.

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In general terms, it is possible to state that all pasta filata cheeses are obtained by a working scheme essentially comprising the following steps: milk treatment, acidification (by adding ferments or organic acids such as citric acid), addition of rennet, curdling, cutting of the curd, extraction of whey, kneading and stretching in hot water ("filatura"), shaping, cooling and stiffening, packaging with or without a conservation (preserving) liquid of the final product. Therefore, differences that can be found in the different preparations are due to the kind of milk used and to the variation of technology adopted, and the products thus obtained are quite similar to one another.

For the cooker-stretcher step for pasta filata, a circulating hot water system is usually used. This heats the mass of curd to the target temperature (usually between 125 and 142 F).

In this step a significant amount of cheese solids may be lost to the cooker water. Significant amount of resources are dedicated for the recovery of the solids and the disposal of liquids.

In view of the high demand for cheese and the foregoing shortcomings associated with some exiting methods for preparing such cheeses with the desired performance characteristics, there thus remains a need for additional methods and systems for preparing cheeses or these types.

BRIEF SUMMARY

The disclosure relates to a method of making a pasta filata cheese. In one embodiment, the method comprises heating a pasta filata-type cheese curd using electromagnetic energy contained within a tubular housing. In one embodiment, the electromagnetic energy source is microwave energy. In another embodiment, the electromagnetic energy source is Radio Frequency energy.

To optimize quality of the pasta filata cheese, various ingredients may be added before or after heating the cheese curd with microwave energy.

In yet another embodiment, the disclosure relates to a method of making pasta filata cheese comprising heating and/or cooking a dairy product contained within a first housing using an electromagnetic energy source contained within a second housing, wherein at least a portion of the first housing is contained within the second housing. In one embodiment, the first housing has a tubular structure. In yet another embodiment, the second housing has a tubular structure. In yet another embodiment, the first and second housings are separated by one or more additional tubes.

In another embodiment, the disclosure relates to a method of making pasta filata cheese comprising heating and/or cooking a dairy product contained within a first tube using an electromagnetic energy source contained within a second tube, wherein at least a portion of the first tube is contained, either directly or indirectly, within the second tube. In yet another embodiment, the first and second tubes are separated by one or more additional tubes. In one embodiment, a portion of a first tube containing a dairy product ("product tube") is contained within a third tube (energy suppression unit) and a portion of the third tube (containing a portion of the first tube) is contained within a portion of a second tube ("cooking chamber") containing an electromagnetic energy source.

In another embodiment, the disclosure relates to a method of making pasta filata cheese comprising heating and/or cooking a dairy product contained within a first tubular housing using an electromagnetic energy source contained within a tubular second housing, wherein at least a portion of the first tubular housing is contained, either directly or indirectly, within the second tubular housing.

In one embodiment, the disclosure relates to a method for making pasta filata cheese comprising: (a) heating cheese curd contained within a first tubular housing using electromagnetic energy, wherein an electromagnetic energy source is contained within a second tubular housing, and further wherein a portion of the second tubular housing surrounds a portion of the first tubular housing.

In one embodiment, a portion of a first tubular housing containing a dairy product ("product housing") is contained within a second tubular housing ("cooking chamber") containing an electromagnetic energy source. In one embodiment, a portion of the first tubular housing may be contained in a portion of the second tubular housing without any additional structures between the first and second tubular housings. A portion of the first tubular housing is directly within a portion of the second tubular housing.

In yet another embodiment, a portion of the first tubular housing may be indirectly contained within a portion of the second tubular housing. One or more structures, including one or more tubular housings, may separate the first and second tubular housings.

In one embodiment, a portion of a first tubular housing containing a dairy product ("product tube") is contained within a third tubular housing (energy suppression unit) and a portion of the third tubular housing (containing a portion of the first tubular housing) is contained within a portion of a second tubular housing ("cooking chamber") containing an electromagnetic energy source.

In still another embodiment, the second tubular housing surrounds at least a portion of the first tubular housing. In yet another embodiment, the second tubular housing surrounds a middle portion of a first tubular housing, wherein the first tubular housing has a front portion, a middle portion and a back portion. In one embodiment, the second tubular housing comprises an electromagnetic energy source.

In one embodiment, the length of the first tubular housing extends beyond the length of the second tubular housing in at least one direction. In one embodiment, length of the first tubular housing extends beyond the length of the second tubular housing in both directions.

In one embodiment, the disclosure relates to a method of making pasta filata cheese comprising heating cheese curd using energy from a microwave system contained within a tubular housing, wherein the microwave system delivers from about 10 to about 20 kw, from about 20 to about 30 kw, from about 30 to about 40 kw, from about 40 to about 50 kw, from about 50 to about 60, from about 60 to about 70 kw, from about 70 to about 80 kw, from about 80 kw to about 90 kw, from about 90 to about 100 kw, from about 100 to about 110 kw, from about 110 to about 120 kw, from about 120 to about 130 kw, from about 130 to about 140 kw, from about 14 to about 150 kw, from about 150 to about 160 kw, from about 160 to about 170 kw, from about 170 to about 180 kw, from about 180 to about 190 kw, from about 190 to about 200 kw, from about 200 to about 210 kw, from about 210 to about 220 kw, from about 220 to about 230 kw, from about 230 to about 240 kw, from about 240 to about 250 kw, from about 250 to about 260 kw, from about 260 to about 270 kw, from about 270 to about 280 kw, from about 280 to about 290 kw, and from about 290 to about 300 kW of power.

In one embodiment, a conveyor belt is used to move the cheese curd through the microwave system. Moreover, the aforementioned method can be carried out by means of an apparatus that allows adjusting the heating time, by controlling the speed of the conveyor or transporter belt.

In one embodiment the speed of the conveyor belt is from about 5 in/min to about 60 in/min. In yet another embodiment, the cheese curd remains in the microwave system for a period of time selected from the group consisting of 3-5, 5-10, 10-15, 15-30, 30-45, 45-60, 60-65, 65-75, 75-85, and 85-90 seconds.

In another embodiment, the disclosure relates to a method for making pasta filata cheese comprising: (a) manipulating cheese curd to create a uniform heating profile; and (b) heating cheese curd from step (a) in a first tubular housing using electromagnetic energy, wherein the electromagnetic energy source is located within a second tubular housing, and further wherein a portion of the second tubular housing surrounds a portion of the first tubular housing.

In another embodiment, the disclosure relates to a system for cooking cheese comprising a first tubular housing for containing the dairy product and a second tubular housing containing an electromagnetic energy source, wherein at least a portion of the first tubular housing is located within the second tubular housing.

In yet another embodiment, the disclosure relates to a system for cooking cheese comprising a first tubular housing for containing the dairy product, a second tubular housing containing an electromagnetic energy source, and a third tubular housing containing an energy suppression unit, wherein a portion of the first tubular housing is located within a portion of the third tubular housing, and further wherein a portion of the third tubular housing, which contains the portion of the first tubular housing, is located within the second tubular housing. In one embodiment, the system is a tube (first tube containing product) within a tube (third tube functioning as energy suppression) within a tube (second tube containing electromagnetic energy source.

In still another embodiment, the disclosure relates to a system for making cheese comprising a cooking chamber containing an electromagnetic energy source, an energy suppression unit, and a product chamber containing dairy product, wherein the cooking surrounds a portion of the energy suppression unit, and the energy suppression unit surrounds a portion of the product chamber.

In one embodiment, the system disclosed herein is similar to a Russian nesting doll or babushka doll. The cooking chamber is the largest tubular housing; a portion of the energy suppression unit is located within the cooking chamber, and a portion of the product chamber is located within the energy suppression unit.

In another embodiment, the disclosure relates to a system for cooking cheese comprising a cyclone with a transfer tube for receiving cheese curd, an ingredient dispenser for adding ingredients to the cheese curd from the cyclone, a first tube for containing the cheese curd, a second tube containing an electromagnetic energy system for heating the cheese curd and the ingredients from the ingredient dispenser, and augers for mixing and stretching the cooked and/or melted cheese curd. In one embodiment, the second tube surrounds at least a portion of the first tube.

In another embodiment, the system comprises a mechanical belt for transporting cheese. In still another embodiment, the system comprises a clean in place mechanism for cleaning the conveyor or transporting belt during the production run to prevent over heating of some cheese particulate.

In another embodiment, the disclosure relates to a system for heating cheese curd comprising a product leveling apparatus for shaping or sizing the cheese curd, a first housing that accepts the cheese curd from the product leveling apparatus and an electromagnetic energy source for heating cheese curd located in a second housing, wherein at least a portion of the first housing passes through the second housing.

In another embodiment, the disclosure relates to a system for heating cheese curd comprising a product leveling apparatus for shaping or sizing the cheese curd, a sensor for determining the profile of the shaped or sized cheese curd, a first housing comprising the shaped or sized cheese curd from the product leveling apparatus; and a second housing comprising an electromagnetic energy system for heating cheese curd. In one embodiment, at least a portion of the first housing passes through at least a portion the second housing. In one embodiment, the sensor determines a heating profile. In still yet another embodiment, the sensor is a three-dimensional sensor.

In another embodiment, the disclosure relates to a system for heating cheese curd comprising a product leveling apparatus for shaping or sizing the cheese curd, a sensor for determining the profile of the shaped or sized cheese curd, a first housing for conveying the shaped or sized cheese curd through a second housing that functions as a cooking chamber, wherein the second housing comprises a third housing located between the first housing and the second housing. In one embodiment, one or more of the first, second or third housings have a tube or a tube-like structure.

In another embodiment, the disclosure relates to a system for heating cheese curd comprising a product leveling apparatus for shaping or sizing the cheese curd, a first housing for passing the shaped cheese curd through a second housing, wherein the second housing comprises an electromagnetic energy system for heating cheese curd, and augers for mixing and stretching the cheese curd. In one embodiment, the electromagnetic energy system is an RF energy system. In yet another embodiment, the electromagnetic energy system is a microwave system.

An advantage of the methods, systems and apparatuses disclosed herein is that electromagnetic technology can reduce the costs of energy, labor and material.

An advantage of the methods, systems and apparatuses disclosed herein is that electromagnetic technology offers the possibility to change a batch process into a continuous process.

An advantage of the methods, systems, and apparatuses disclosed herein is that electromagnetic technology makes use of electrical energy, which gives the user the possibility for a stand-alone installation.

An advantage of the methods, systems, and apparatuses disclosed herein is that RF technology does not use fossil energy, only electrical energy, which is more sustainable in the future.

An advantage of the methods, systems, and apparatuses disclosed herein is that RF energy provides speed and uniformity: heating occurs instantly and uniformly throughout the mass of a homogenous material. No temperature differential is required to force heat via conduction from the surface to the center as in convection or infrared heating processes.

An advantage of the methods, systems, and apparatuses disclosed herein is that RF energy provides selective heating: heating will occur selectively in those areas where heat is needed because water and uncured latices are much more responsive to RF energy than most other dielectric materials.

An advantage or the methods, systems, and apparatuses disclosed herein is that RF energy provides moisture equilibration: wetter areas absorb more RF power than dryer areas, more water is automatically removed from wet areas resulting in a more uniform moisture distribution.

An advantage of the methods, systems, and apparatuses disclosed herein is that RF energy provides space saving: the applicator, or electrode section, is slightly wider than the load itself. Length will be a small fraction of the length of the convection dryer required to do the same work. Special applicator designs may be used, multi-pass, multi-zone, arched, inclined, or vertical.

An advantage of the methods, systems, and apparatuses disclosed herein is that RF energy provides physical contact: the load may be supported by electrodes or conveyed under or between them. Self-supporting webs or strands need not touch anything, thus avoiding surface marking and contamination.

An advantage of the methods, systems, and apparatuses disclosed herein is that RF energy provides efficiency: power is consumed primarily in the work load. There are not losses from heating masses of cast iron or huge volumes of hot air—no long warm up or cooling times are required. Power is consumed only when the load is present and only in proportion to the load.

An advantage of the methods, systems, and apparatuses disclosed herein is that RF energy provides precise control: power control is accurately metered and may be recorded. A meter constantly displays the amount of power being applied to heat the product.

An advantage of the methods, systems, and apparatuses disclosed herein is that RF energy provides quick response: the full range of power control from minimum to maximum is traversed in seconds. Adjustments take effect immediately. Thermal lag time is zero. Automatic changes in power level due to physical properties or size of load are instantaneous.

An advantage of the methods, systems, and apparatuses disclosed herein is that RF energy provides self-limited heating when a dielectric material is polymerized, dried, or cured, its loss factor is lowered, reducing its response to RF energy. RF heating is, therefore, automatically limited to the level required to complete the process.

An advantage of the methods, systems, and apparatuses disclosed herein is that RF energy provides process feedback: the RF heater is a sensitive moisture meter. Its power output is a measure of the average moisture content of the load. Changes in power output, as indicated by the plate current meter, can be used to trigger alarms or provide feedback signals for process control.

An advantage of the methods disclosed herein is that better solids retention and increased product yield ranging from about 0.5% by weight to about 2% by weight as compared to traditional methods of making pasta filata will be achieved.

An advantage of the methods and systems disclosed herein is that the electromagnetic energy source is separate from the mixer/extruder.

An advantage of the methods and systems disclosed herein is that the chamber comprising the electromagnetic energy system, the curd can be stretched at a lower pH.

An advantage of the methods and systems disclosed herein is the that the electromagnetic energy system is not used as a stretcher.

An advantage of the methods and systems disclosed herein is that the electromagnetic energy source is used as a cooker.

An advantage of the methods and systems disclosed herein is that a stretcher is a separate apparatus from the electromagnetic energy source.

DETAILED DESCRIPTION

Definitions

Figure 1:
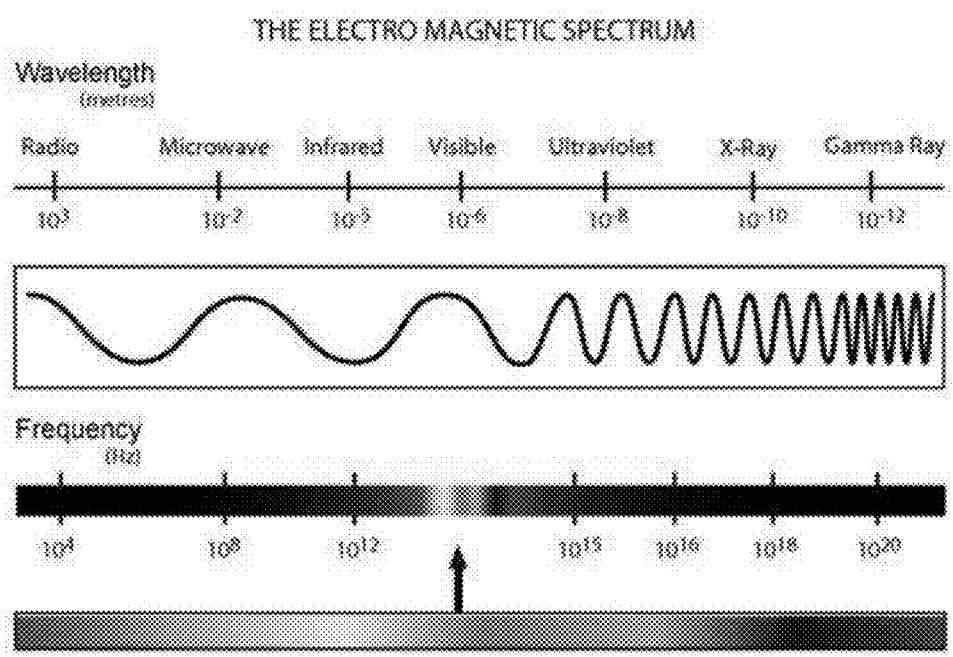
FIG. 1 provides a schematic of the Electromagnetic spectrum.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional number greater then one (e.g., 1.1, 1.5, etc.), one unit is considered to be 0.0001, 0.001, 0.01 or 0.1, as appropriate. For ranges containing single digit numbers less then ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

As used herein, "about" refers to up to plus or minus 10% of the indicated number. For example, "about 25° C." refers to 22.5° C. to 27.5° C. In some embodiments, about refers to up to plus or minus 9, 8, 7, 6, 5, 4, 3, 2, or 1% of the indicated number. When only integer values are possible, "about" refers to up to plus or minus 10% rounded to the nearest integer number. All numbers and numerical ranges recited herein are intended to include the term "about." Thus, even if the number or numerical range is not preceded by the term "about," number or numerical range are intended to cover plus or minus 10% of the indicated number. For example, a recited temperature range of "10 to 20" is intended to include "9 to 22."

As used herein, "auger stretching" refers to a continuous stretching and mixing of cheese and ingredients with a low, medium, or high moisture content. The auger pitch, overlap and clearances are key to the performance and capacity of the unit.

As used herein, Clean-In-Place Section Belt Cleaning refers to the belt that will be continuously water rinsed during the production process to restrict the reheating of cheese particles that cling to the belt. In one embodiment, the cabinet or component containing the microwave energy source can be manually cleaned.

As used herein, the Clean-in-Place Cabinet Cleaning refers to the microwave cabinet that will be efficiently and automatically cleaned via a CIP wash and rinse cycle provided by a CIP system.

As used herein, a cyclone is an apparatus for separation of cheese curd in an airstream by the use of centrifugal forces. Cheese curd drops out of the bottom and air is evacuated out the top.

As used herein, a curd mill may reduce the size of the curd to a uniform size necessary for providing even heating. In one embodiment, a curd mill may be used while in other embodiments, a curd mill may not be required.

As used herein, a curd mill may reduce the size of the curd to a uniform size necessary for providing even heating. In one embodiment, a curd mill may be used while in other embodiments, a curd mill may not be required.

As used herein, "electromagnetic radiation" and "electromagnetic energy" are used interchangeably.

As used herein, fluid dispensing refers to positive displacement pump heads couples with a stepping motor drive or other positive displacement or metering device allowing the system to have highly precise flow rates of liquids and slurry delivery.

As used herein, an ingredient dispenser feeds dry ingredients at a precise and adjustable flow rate. The dispenser utilizes a positive driven internal auger to gently fluidize ingredients without breaking down the base composition.

As used herein, "heating" refers to the process of increasing the temperature of a product, including but not limited to a dairy product and cheese curd. In one embodiment, heating results in cooking the product to the final state. In another embodiment, heating encompasses transforming the product from a first uncooked state to a second uncooked state. In still another embodiment, heating encompasses transforming a product from an uncooked state to a cooked state.

As used herein, the term "input material" includes but is not limited to cheese precursor, curd precursor, cream, and cheese curd.

As used herein, the term "manipulating" refers to transforming a product from a first state to a second state. In one embodiment, manipulating includes but is not limited to shaping, molding, sizing, cutting, milling, grinding, leveling and augering a product. In yet another embodiment, manipulating includes transforming a product from a first state to a second state, wherein the second state has a more uniform shape, size, volume, density, mass or weight as compared to the first state.

As used herein, a "microwave system" refers to any device, apparatus or method for heating using microwaves. Microwave systems contemplated herein include systems that heat exclusively with the use of microwaves and systems that heat with both microwaves and other heat sources.

As used herein, the phrase "heating profile" refers to the heating characteristics and/or dimension of the product. The phrase "heating profile" includes but is not limited to the rate at which the product can absorb energy/heat. The phrase heating profile can include but is not limited to the thickness of the product, the volume of the product, the length, width, and height of the product, the density of the product, and the mass of the product.

As used herein, the phrase "passes through or passing trough" refers to at least a portion of a first structure located within at least a portion of a second structure, either directly or indirectly. For purposes of clarity, the phrase "structure B passes through structure A" encompasses structure "B" located within structure "A" directly, meaning at least a portion of structure "B" is located within at least a portion of structure "A." In addition, the phrase "B passes through A" also encompasses the situation where at least a portion of structure "B" is located within at least a portion of structure "C," wherein at least a portion of structure "C" is located within at least a portion of structure "A."

As used herein, the term "product leveling apparatus" refers to one or more devices that transform a product from a first state to a second state, wherein the second state has a more uniform profile as compared to the first state. In one embodiment, the product leveling apparatus transform a product to have a uniform profile with regard to shape, size, volume, weight, density, or mass. In one embodiment, the product leveling apparatus can transform the product by any method including but not limited to cutting, milling, shaping, molding, leveling, grinding, augering, separating, or flattening the product.

As used herein, the term "surrounds" refers to at least portion of a first structure encapsulating, engulfing, or covering at least a portion of a second structure, either directly or indirectly. For purposes of clarity, the phrase "A surrounds B" encompasses structure "A" surrounding structure "B" directly, meaning at least a portion of structure "A" surrounds at least a portion of structure "B". In addition, the phrase "A surrounds B" also encompasses the situation where at least a portion of structure "A" surrounds at least a portion of a structure "C," wherein at least a portion of structure "C" surrounds at least a portion of structure "B."

As used herein, the term "tube" refers to a cylindrical structure for conveying or containing objects, solids, liquids, gases, and semi-solids. In one embodiment, a tube may have a hollow interior.

As used herein, the term "tubular housing" refers to any structure used for housing objects, solids, liquids, gases, and semi-solids. In one embodiment, a tubular housing may have a long design with at least a portion of the interior hollow. In another embodiment, a tubular housing may have a long, narrow design with at least a portion of the interior hollow. In one embodiment, the tubular housing is designed to accept a second structure within the interior of the tubular housing, including but not limited to a second tubular housing.

As used herein, the phrase "uniform profile" refers to the homogeneity of the characteristics of a product, including but not limited to shape, size, volume, weight, density, or mass of a product. In one embodiment, a uniform profile includes but is not limited to 100% of the product having the same characteristics, 50-99% of the product having the same characteristics, 60-99% of the product having the same characteristics, 65-99% of the product having the same characteristics, 70-99% of the product having the same characteristics, 75-99% of the product having the same characteristics, 80-99% of the product having the same characteristics, 85-99% of the product having the same characteristics, and 90-99% of the product having the same characteristics. In another embodiment, a uniform profile includes but is not limited to 95-99% of the product having the same characteristics, 92-95% of the product having the same characteristics, 87-92% of the product having the characteristics, 84-87% of the product having the same characteristics, 81-84% of the product having the same characteristics, 78-81% of the product having the same characteristics, 75-78% of the product having the same characteristics, 72-75% of the product having the same characteristics, 69-72% of the product having the same characteristics, 66-69% of the product having the same characteristics, 63-66% of the product having the same characteristics, 60-63% of the product having the same characteristics, and 50-54% of the product having the same characteristics.

As used herein, the phrase "uniform heating profile" refers to the homogeneity of the heating profile of a product including but not limited to a dairy product and a cheese curd. In one embodiment, a uniform heating profile includes but is not limited to 100% of the product having the same heating profile, 50-99% of the product having the same heating profile, 60-99% of the product having the same heating profile, 65-99% of the product having the same heating profile, 70-99% of the product having the same heating profile, 75-99% of the product having the same heating profile, 80-99% of the product having the same heating profile, 85-99% of the product having the same heating profile, and 90-99% of the product having the same heating profile. In another embodiment, a uniform heating profile includes but is not limited to 95-99% of the product having the same heating profile, 92-95% of the product having the same heating profile, 87-92% of the product having the same heating profile, 84-87% of the product having the same heating profile, 8184% of the product having the same heating profile, 78-81% of the product having the same heating profile, 75-78% of the product having the same heating profile, 72-75% of the product having the same heating profile, 69-72% of the product having the same heating profile, 66-69% of the product having the same heating profile, 63-66% of the product having the same heating profile, 60-63% of the product having the same heating profile, 57-60% of the product having the same heating profile, 54-57% of the product having the same heating profile, and 50-54% of the product having the same heating profile.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and cheeses with a MFFB, for example, of about 58% to about 75%, by wt. The term may also include soft cheeses with a MFFB of greater than about 60%, by wt. The term encompasses a variety of well-known cheeses including, but not limited to, Colby, Havarati, Monterey Jack, Gorgonzola, Gouda, Cheshire and Muenster, which are examples of "firm/semi-hard cheeses." Also included in the term are popular "soft cheeses" such as Mozzarella, cream cheese, and cottage cheese. A variety of mozzarella cheeses are included by the term, these can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls with the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters set forth above.

The "soft" and "firm/semi-hard" cheeses that are provided include standard and non-standard cheeses and cheese products having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% by weight of the solids and the moisture content of more than 52% but not more than 60% by weight, and a milk fat content that is less than 45% but not less than 30% calculated on the solid basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §§ 1.33.155-133.158.

The term "cheese precursor" as used herein refers broadly to any ingredient that is used to prepare a cheese curd, mixtures of such ingredients and subsequent processed forms of the cheese curd other than the final cheese product. Examples of cheese precursors that are ingredients include, but are not limited to, unpasteurized milk (sometimes referred to in the industry as "raw milk"), the growth medium and bacteria used in the cheese making process (sometimes referred to in the industry as "starter"), and cream. Mixtures of such ingredients are also included. One specific example of such mixtures is "vat liquid," which is a term used to refer to a combination of pasteurized milk, starter and cream. The term also includes coagulum, cheese curd, and processed cheese curd, and whey.

The term "cream" means the liquid mild product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Pro-cream" is the liquid milk product high in fat collected as retentate from a whey filtration process such as microfiltration which may have been adjusted by adding thereto: whey, concentrated whey, dry whey, or other GRAS ingredients.

The term "curd precursor" refers to any soft or firm/semi-hard cheese ingredient, mixture or composition that exists or is formed prior to formation of the cheese curd. The term thus includes, for example, raw milk, milk powder, milk concentrate, skim milk concentrate, starter, cream, cheese vat liquids and coagulum.

The methods and apparatuses disclosed herein are directed toward pasta filata cheese. The principal varieties of pasta filata cheeses are: Caciocavallo, Provolone, Provolette, Pizza Cheese, Mozzarella, Provole, Scarmorze, and Provatora. The well-known example of pasta filata-type of cheese is mozzarella cheeses into: "Mozzarella", "Low Moisture Mozzarella", "Part Skim Mozzarella" and "Low Moisture Part Skim Mozzarella."

I. Methods of Making Pasta Filata Cheese with Electromagnetic Energy

In one embodiment, the disclosure relates to a method of making a pasta filata cheese by heating a traditional curd using an electromagnetic energy system contained within a tube. In another embodiment, the disclosure related to a method of making pasta filata cheese comprising heating cheese curd contained in a first tubular housing using an electromagnetic energy source contained within a second tubular housing. In one embodiment, the second tubular housing surrounds at least a portion of the first tubular housing.

The methods disclosed herein can be used to produce any of the traditional cheeses broadly described as pasta filata cheeses. The cheeses made by the methods disclosed herein will replicate the flavor, functionally and appearance of traditional cheeses of these types. The ability to achieve a cheese with the characteristics of these traditional cheeses using a microwave system provides distinct economic advantages over producing traditional mozzarella in the conventional manner.

In one embodiment, the methods disclosed herein will obtain better solids recovery and increased product yield as compared to traditional methods of making pasta filata. In one embodiment, the methods disclosed herein will obtain better solids recovery and increased product yield ranging from about 0.1% by weight to about 0.5% by weight as compared to traditional methods of making pasta filata. Throughout this description, all percentages are by weight, unless otherwise specified.

In one embodiment, the methods disclosed herein will obtain better solids recovery and increased product yield ranging from about 0.5% by weight to about 2% by weight as compared to traditional methods of making pasta filata.

In one embodiment, the methods disclosed herein will obtain better solids recovery and increased product yield ranging from about 0.75% by weight to about 3% by weight as compared to traditional methods of making pasta filata.

In one embodiment, the methods disclosed herein will obtain better solids recovery and increased product yield ranging from about 1% by weight to about 4% by weight as compared to traditional methods of making pasta filata.

In one embodiment, the methods disclosed herein will increase solids recovery and product yield in excess of about 0.2% by weight as compared to traditional methods of making pasta filata.

In one embodiment, the methods disclosed herein will obtain better solids recovery and increased product yield in excess of about 0.5% by weight as compared to traditional methods of making pasta filata.

In one embodiment, the methods disclosed herein will obtain better solids recovery and increased product yield in excess of about 1% by weight as compared to traditional methods of making pasta filata.

Not wishing to be bound by any particular theory, the methods disclosed herein increase solids recovery at least in part because the material is not cooked in water and thus, there is not waste stream created.

A. Electromagnetic Radiation

Electromagnetics radiation (EM radiation of EMR) is a form of radiant energy, propagating through space via electromagnetic waves and/or particles called photons. In a vacuum, it propogates at a characteristic speed, the speed of light, normally in straight lines. EMR is emitted and absorbed by charged particles. As an electromagnetic wave, it has both electric and magnetic field components, which oscillate in a fixed relationship to one another, perpendicular to each other and perpendicular to the direction of energy and wave propagation.

EMR carries energy—sometimes called radiant energy—through space continuously away from the source (this is not true of the near-field part of the EM field). EMR also carries both momentum and angular momentum. These properties may all be imparted to matter with which it interacts. EMR is produced from other types of energy when created, and it is converted to other types of energy when it is destroyed.

The electromagnetic spectrum, in order of increasing frequency and decreasing wavelength, can be divided, for practical engineering purposes, into radio waves, microwaves, infrared radiation, visible light, ultraviolet radiation, X-rays and gamma rays. The eyes of various organisms sense a relatively small range of frequencies of EMR called the visible spectrum or light; what is visible depends somewhat on which species of organism is under consideration. Higher frequencies (shorter wavelengths) correspond to proportionately more energy carried by each photon, according to the well-known law, E=hv, where E is the energy per photon, v is the frequency carried by the photon, and h is Planck's constant. For instance, a single gamma ray photon carries far more energy than a single photon of visible light.

FIG. 1 provides a schematic of the Electromagnetic spectrum.

1. Microwave Energy

In one embodiment, the disclosure relates to a method of making pasta filata cheese comprising cooking and/or melting cheese curd using energy from a microwave system, wherein the microwave system is contained within a tubular housing. In one embodiment, the disclosure relates to a method of making pasta filata cheese comprising heating cheese curd using a microwave energy source contained within a tubular housing. In another embodiment, the method further comprises stretching the cooked or melted cheese curd through the use of augers.

In yet another embodiment, the disclosure relates to a method for making pasta filata cheese comprising heating cheese curd contained within a first housing using microwave energy, wherein the microwave energy source is contained in a second housing, and further wherein the second housing surrounds at least a portion of the first housing. In one embodiment, a portion of the first housing fits within a portion of the second housing.

In yet another embodiment, the disclosure relates to a method for making pasta filata cheese comprising heating cheese curd contained within a first tubular housing using microwave energy, wherein the microwave energy source is contained in a second tubular housing. In one embodiment, the second tubular housing surrounds at least a portion of the first tubular housing. In one embodiment, the first tubular housing fits within the second tubular housing. In another embodiment, the methods disclosed herein employ a tube-within-a-tube-design.

In yet another embodiment, the disclosure relates to a method of making pasta filata cheese comprising creating a uniform shape or profile of cheese curd, heating cheese curd contained in a first tubular housing using microwave energy, wherein the microwave energy source is contained within a second tubular housing, and further wherein at least a portion of the first tubular housing passes through at least a portion of the second tubular housing.

In one embodiment, a portion of the first tube is encapsulated within a portion of the second tube, employing a tube-within-a-tube design. In other words, a portion of the second tube surrounds a portion of the first tube.

In still another embodiment, the disclosure relates to a method of making pasta filata cheese comprising leveling cheese curd to create a uniform heating profile, transporting cheese curd into a first tubular housing and heating cheese curd using microwave energy contained within a second tubular housing, wherein at least a portion of the first tubular housing passes through at least a portion of the second tubular housing. In one embodiment, at least a portion of the first tubular housing is located within the interior of the second tubular housing.

In one embodiment, the microwave system delivers energy from about 100 watts to about 400 kW. In yet another embodiment the microwave energy is from about 100 watts to about 400 kW.

In another embodiment, the microwave system delivers energy form 100-150, 150-200, 200-250, 250-300, 300-350, 350-400, 400-450, 450-500, 500-550, 550-600, 600-650, 650-700, 700-750, 750-800, 800-850, 850-900, 900-950, 950-1000 watts.

In yet another embodiment, the microwave system operates from about 30 kw to about 400 kw. In yet another embodiment, the microwave system operates from about 30 kw to about 360 kw. In yet another embodiment, the microwave system operates from about 30 kw to about 330 kw. In yet another embodiment, the microwave system operates from about 30 kw to about 300 kw. In yet another embodiment, the microwave system operates from about 30 kw to about 270 kw. In yet another embodiment, the microwave system operates form about 30 kw to about 240 kw. In yet another embodiment, the microwave system operates from about 30 kw to about 210 kw. In yet another embodiment, the microwave system operates from about 30 kw to about 180 kw. In yet another embodiment, the microwave system operates from about 30 kw to about 150 kw. In yet another embodiment, the microwave system operates from about 30 kw to about 120 kw. In yet another embodiment, the microwave system operates from about 30 kw to about 90 kw. In yet another embodiment, the microwave system operates from about 30 kw to about 60 kw.

In yet another embodiment, the microwave system operates from about 60 kw to about 300 kw. In yet another embodiment, the microwave system operates from about 90 kw to about 300 kw. In yet another embodiment, the microwave system operates from about 120 kw to about 300 kw. In yet another embodiment, the microwave system operates from about 150 kw to about 300 kw. In yet another embodiment, the microwave system operates from about 180 kw to about 300 kw. In yet another embodiment, the microwave system operates from about 210 kw to about 300 kw. In yet another embodiment, the microwave system operates from about 240 kw to about 300 kw. In yet another embodiment, the microwave system operates from about 270 kw to about 300 kw.

In yet another embodiment, the microwave system operates from about 30 kw to about 300 kw, from about 40 kw to about 290 kw, from about 50 kw to about 280 kw, from about 60 kw to about 270 kw, from about 70 kw to about 260 kw, from about 80 kw to about 250 kw, from about 90 kw to about 240 kw, from about 100 kw to about 230 kw, from about 110 kw, to about 220 kw, from about 120 kw to about 210 kw, from about 130 kw to about 200 kw, from about 140 kw to about 190 kw, from about 150 kw to about 180 kw, and from about 160 kw to abut 170 kw.

In yet still another embodiment, microwave system operates from about 50 to about 225 kw, from about 55 to about 220 kw, from about 60 to about 215 kw, from about 65 to about 210 kw, from about 70 to about 200 kw, from about 75 to about 195 kw, from about 80 to about 190 kw, from about 85 to about 185 kw, from about 90 to about 180 kw, from about 95 to about 175 kw, from about 100 to about 170 kw, from about 105 to about 165 kw, from about 110 to about 160 kw, from about 115 to about 155 kw, from about 120 to about 150 kw, from about 125 to about 145 kw, and from about 130 to about 140 kw.

In yet still another embodiment, microwave system operates from about 50 to about 225 kw, from about 55 to about 225 kw, from about 60 to about 225 kw, from about 65 to about 225 kw, from about 70 to about 225 kw, from about 75 to about 225 kw, from about 80 to about 225 kw, from about 85 to about 225 kw, from about 90 to about 225 kw, from about 95 to about 225 kw, from about 100 to about 225 kw, from about 105 to about 225 kw, from about 110 to about 225 kw, from about 115 to about 225 kw, from about 120 to about 225 kw, from about 125 to about 225 kw, from about 130 to about 225 kw, from about 135 to about 225 kw, from about 140 to about 225 kw, from about 145 to about 225 kw, from about 150 to about 225 kw, from about 155 to about 225 kw, from about 160 to about 225 kw, from about 165 to about 225 kw, from about 170 to about 225 kw, from about 175 to about 225 kw, from about 180 to about 225 kw, from about 185 to about 225 kw, from about 190 to about 225 kw, from about 195 to about 225 kw, from about 200 to about 225 kw, from about 205 to about 225 kw, from about 210 to about 225 kw, from abut 215 to about 225 kw, and from about 220 to about 225 kw.

In still another embodiment, microwave system delivers energy form 1-3 kw, 3-5 kw, 5-7 kw, 7-9 kw, 9-11 kw, 11-15 kw, 15-20 kw, 20-25 kw, 25-30 kw, 30-35 kw, 35-40 kw, 40-45 kw, 45-50 kw, 50-55 kw, 55-60 kw, 60-65 kw, 65-70 kw, 70-75 kw, 75-80 kw, 80-85 kw, 85-90 kw, 90-95 kw, 95-100 kw, 100-110 kw, 110-120 kw, 120-130 kw, 130-140 kw, 140-150 kw, 150-160 kw, 160-170 kw, 170-180 kw, 180-190 kw, 190-200 kw, 200-210 kw, 210-220 kw, 220-230 kw, 230-240 kw, 240-250 kw, 250-260 kw, 260-270 kw, 270-280 kw, 280-290 kw, 290-300 kw, 300-310 kw, 310-320 kw, 320-330 kw, 330-340 kw, 340-350 kw, 350-360 kw, 360-370 kw, 370-380 kw, 380-390 kw, 390-400 kw, and greater then 400 kw.

In yet another embodiment, the method comprises leveling the cheese curd prior to heating to create a uniform heating profile. In still another embodiment, the method further comprises stretching the cooked or melted cheese curd through the use of augers.

In another embodiment, the microwave energy source delivers an amount of energy selected from the group consisting of 1 kw, 2 kw, 3, k3, 4 kw, 5 kw, 6, kw, 7 kw, 8 kw, 9 kw, 10 kw, 11 kw, 12 kw, 13 kw, 14 kw, 15 kw, 16 kw, 17 kw, 18 kw, 19 kw, 20 kw, 21 kw, 22 kw, 23 kw, 24 kw, 25 kw, 26 kw, 27 kw, 28 kw, 29 kw, 30 kw, 31 kw, 32 kw, 33 kw, 34 kw, 35 kw, 36 kw, 37 kw, 38 kw, 39 kw, 40 kw, 41 kw, 42 kw, 43 kw, 44 kw, 45 kw, 46 kw, 47 kw, 48 kw, 49 kw, 50 kw, 51 kw, 52 kw, 53 kw, 54 kw, 55 kw, 56 kw, 57 kw, 58 kw, 59 kw, 60 kw, 61 kw, 62 kw, 63 kw, 64 kw, 65 kw, 66 kw, 67 kw, 68 kw, 69 kw, 70 kw, 71 kw, 72 kw, 73 kw, 74 kw, 75 kw, 76 kw, 77 kw, 78 kw, 79 kw, 80 kw, 81 kw, 82 kw, 83 kw, 84 kw, 85 kw, 86 kw, 87 kw, 88 kw, 89 kw, 90 kw, 91 kw, 92 kw, 93 kw, 94 kw, 95 kw, 96 kw, 97 kw, 98 kw, 99 kw, 100 kw, 101 kw, 102 kw, 103 kw, 104 kw, 105 kw, 106 kw, 107 kw, 108 kw, 109 kw, 110 kw, 111 kw, 112 kw, 113 kw, 114 kw, 115 kw, 116 kw, 117 kw, 118 kw, 119 kw, 120 kw, 121 kw, 122 kw, 123 kw, 124 kw, 125 kw, 126 kw, 127 kw, 128 kw, 129 kw, 130 kw, 131 kw, 132 kw, 133 kw, 134 kw, 135 kw, 136 kw, 137 kw, 138 kw, 139 kw, 140 kw, 141 kw, 142 kw, 143 kw, 144 kw, 145 kw, 146 kw, 147 kw, 148 kw, 149 kw, 150 kw, 151 kw, 152 kw, 153 kw, 154 kw, 155 kw, 156 kw, 157 kw, 158 kw, 159 kw, 160 kw, 161 kw, 162 kw, 163 kw, 164 kw, 165 kw, 166 kw, 167 kw, 168 kw, 169 kw, 170 kw, 171 kw, 172 kw, 173 kw, 174 kw, 175 kw, 176 kw, 177 kw, 178 kw, 179 kw, 180 kw, 181 kw, 182 kw, 183 kw, 184 kw, 185 kw, 186 kw, 187 kw, 188 kw, 189 kw, 190 kw, 191 kw, 192 kw, 193 kw, 194 kw, 195 kw, 196 kw, 197 kw, 198 kw, 199 kw, 200 kw, 201 kw, 202 kw, 203 kw, 204 kw, 205 kw, 206 kw, 207 kw, 208 kw, 209 kw, 210 kw, 211 kw, 212 kw, 213 kw, 214 kw, 215 kw, 216 kw, 217 kw, 218 kw, 219 kw, 220 kw, 221 kw, 222 kw, 223 kw, 224 kw, 225 kw, 226 kw, 227 kw, 228 kw, 229 kw, 230 kw, 231 kw, 232 kw, 233 kw, 234 kw, 235 kw, 236 kw, 237 kw, 238 kw, 239 kw, 240 kw, 241 kw, 242 kw, 243 kw, 244 kw, 245 kw, 246 k, 247 kw, 248 kw, 248 kw, 250 kw, 251 kw, 252 kw, 253 kw, 254 kw, 255 kw, 256 kw, 257 kw, 258 kw, 259 kw, 260 kw, 261 kw, 262 kw, 263 kw, 264 kw, 265 kw, 266 kw, 267 kw, 268 kw, 269 kw, 270 kw, 271 kw, 272 kw, 273 kw, 274 kw, 275 kw, 276 kw, 277 kw, 278 kw, 279 kw, 280 kw, 281 kw, 282 kw, 283 kw, 284 kw, 285 kw, 286 kw, 287 kw, 288 kw, 289 kw, 290 kw, 291 kw, 292 kw, 293 kw, 294 kw, 295 kw, 296 kw, 297 kw, 298 kw, 299 kw, and 300 kw.

In one embodiment, the disclosure relates to a method for making pasta filata cheese comprising heating cheese curd contained within a first tubular housing with microwave energy contained within a second tubular housing, wherein from about 63 to about 77 kw is used to heat from about 5,580 to about 6,820 pounds of cheese curd per hour. In one embodiment, the disclosure relates to a method for making pasta filata cheese comprising heating cheese curd contained within a first tubular housing with microwave energy contained within a second tubular housing, wherein about 70 kw is used to about 6200 pounds of cheese curd per hour. In yet another embodiment, the disclosure relates to a method for making pasta filata cheese comprising heating cheese curd contained within a first tubular housing with microwave energy contained within a second tubular housing, wherein about 68 kw is used to heat about 6300 pounds of cheese per hour.

In one embodiment, the disclosure relates to a method for making pasta filata cheese comprising heating cheese curd contained within a first tubular housing with microwave energy contained within a second tubular housing, wherein from about 56 to about 84 kw is used to heat form about 5,000 to about 7,440 pounds of cheese curd per hour.

In one embodiment, the disclosure relates to a method for making pasta filata cheese comprising heating cheese curd contained within a first tubular housing with microwave energy contained within a second tubular housing, where in from about 49 to about 91 kw is used to heat from about 4,340 to about 8,060 pounds of cheese curd per hour.

In one embodiment, the disclosure relates to a method for making pasta filata cheese comprising heating cheese curd contained within a first tubular housing with microwave energy contained within a second tubular housing, wherein form about 42 to about 98 kw is used to heat from about 3,720 to about 8,680 pounds of cheese curd per hour.

In one embodiment, the disclosure relates to a method for making pasta filata cheese comprising heating cheese curd contained within a first tubular housing with microwave energy contained within a second tubular housing, wherein from about 35 to about 105 kw is used to heat from about 3,100 to about 9,300 pounds of cheese curd per hour.

In yet another embodiment, the disclosure relates to a method for making pasta filata cheese comprising heating cheese curd contained within a first tubular housing with microwave energy contained within a second tubular housing, wherein from about 126 to about 154 kw is used to heat from about 11,160 to about 13,640 pounds of cheese curd per hour.

In yet another embodiment, the disclosure relates to a method of making pasta filata cheese comprising heating cheese curd contained within a first tubular housing with microwave energy contained within a second tubular housing, wherein from about 112 to about 168 kw is used to heat from about 9,920 to about 14,880 pounds of cheese curd per hour.

In yet another embodiment, the disclosure relates to a method for making pasta filata cheese comprising heating cheese curd contained within a first tubular housing with microwave energy contained within a second tubular housing, wherein from bout 98 to about 182 kw is used to heat from about 8,680 to about 16,120 pounds of cheese curd per hour.

In yet another embodiment, the disclosure related to a method for making pasta filata cheese comprising heating cheese curd contained within a first tubular housing with microwave energy contained within a second tubular housing, wherein from about 252 to about 308 kw is used to heat from about 22,320 to about 27,280 pounds of cheese curd per hour.

In yet another embodiment, the disclosure relates to a method for making pasta filata cheese comprising heating cheese curd contained within a first tubular housing with microwave energy contained within a second tubular housing, wherein from about 224 to about 336 kw is used to heat from about 19,840 to about 29,760 pounds of cheese card per hour.

In yet another embodiment, the disclosure relates to a method for making pasta filata cheese comprising heating cheese curd contained within a first tubular housing with microwave energy contained within a second tubular housing, wherein from about 196 to about 364 kw is used to heat from about 17,360 to about 32,240 pounds of cheese curd per hour.

In yet another embodiment, the disclosure relates to a method for making pasta filata cheese comprising heating cheese curd contained within a first tubular housing with microwave energy contained within a second tubular housing, wherein from about 168 to about 392 kw is used to heat from about 14,880 to about 34,720 pounds of cheese curd per hour.

In yet another embodiment, the disclosure relates to a method for making pasta filata cheese comprising heating cheese curd contained within a first tubular housing with microwave energy contained within a second tubular housing, wherein from about 31.5 to about 38.5 kw is used to heat from about 2790 to about 3410 pounds of cheese curd per hour.

In yet another embodiment, the disclosure relates to a method for making pasta filata cheese comprising heating cheese curd contained within a first tubular housing with microwave energy contained with a second tubular housing, wherein from about 28 to about 42 kw is used to heat from about 2,480 to about 3,720 pounds of cheese curd per hour.

In yet another embodiment, the disclosure relates to a method for making pasta filata cheese comprising heating cheese curd contained within a first tubular housing with microwave energy contained with a second tubular housing, wherein from about 24.5 to about 45.5 kw is used to heat from about 2,170 to about 4,030 pounds of cheese curd per hour.

In yet another embodiment, the disclosure relates to a method for making pasta filata cheese comprising heating cheese curd contained within a first tubular housing with microwave energy contained with a second tubular housing, wherein from about 21 to about 49 kw is used to heat from about 1860 to about 4,340 pounds of cheese curd per hour.

In another embodiment, the microwave energy can be applied continuously. In yet another embodiment, the microwave energy is applied in intervals including but not limited to 2, 3, 4, 5, 6, 7, 8, 9, 10, 11, 12, 13, 14, 15 and greater than 15 intervals.

In yet another embodiment, the microwave energy can be applied to the cheese curd for a period of time, followed by a resting period where no microwave energy is applied. The resting period can be any desired time periods including but not limited to 5-10 s, 10-15 s, 15-20 s, 20-25 s, 25-30 s, 30-35 s, 35-40 s, 40-45 s, 45-50 s, 50-55 s, 55-60 s, 1-3 min, 3-5 min, 5-7 min, 7-9 min, 9-11 min, 11-13 min, 13-15 min, 15-17 min, 17-19 min, 19-21 min, 21-23 min, 23-25 min, 25-27 min, 27-29 min, 30 min, 30-60 min, 1-2 hours (hrs, 2-4 hrs, 4-6 hrs, 6-8 hrs, 8-10 hrs, and greater than 10 hours.

In another embodiment, there can be numerous cycles of applying microwave energy to the cheese curd followed by a resting period including but not limited to 2, 3, 4, 5, 6, 7, 8, 9, 10, 11, 12, 13, 14, 15, and greater than 15 cycles.

In yet another embodiment, the cheese curd is heated by the microwave energy for a period of time selected from the group consisting of 5-10, 10-15, 15-20, 20-25, 25-30, 30-35, 35-40, 40-45, 45-50, 50-55, 55-60, 60-65, 65-70, 70-75, 75-80, 80-85, 85-90, 90-95, 95-100, 100-110, 110-120, 120-130, 130-140, 140-150, 150-160, 160-170, 170-180, and greater than 180 seconds.

In still another embodiment, the microwave energy can be applied from a single energy source. In another embodiment, the microwave energy can be applied from more than one energy source including but not limited to 2, 3, 4, 5, 6, 7, 8, 9, 10, and greater than 10 energy sources.

In yet another embodiment, the disclosure relates to a method for making pasta filata cheese comprising heating cheese curd contained within a first tubular housing with microwave energy contained within a second tubular housing, wherein the amount of energy needed to cook the cheese to the desired end product is from about 0.01 kw/pound of cheese curd/min to about 5 kw/pound of cheese curd/min.

In another embodiment, the disclosure relates to a method for making pasta filata cheese comprising cooking cheese curd contained in a first tubular housing with a microwave energy source contained in a second tubular housing, wherein the amount of energy needed to cook the cheese to the desired end product is selected from the group consisting of: 0.01-0.1 kw/pound of cheese curd/min 0.1-0.3 kw/pound of cheese curd/min. 0.3-0.5 kw/pound of cheese curd/min, 0.5-0.7 kw/pound of cheese curd/min, 0.7-0.9 kw/pound of cheese curd/min, 0.9-1.0 kw/pound of cheese curd/min, 1.0-1.3 kw/pound of cheese curd/min, 1.3-1.5 kw/pound of cheese curd/min, 1.5-1.7 kw/pound of cheese curd/min, 1.7-1.9 kw/pound of cheese curd/min, 1.9-2.1 kw/pound of cheese curd/min, 2.1-2.3 kw/pound of cheese curd/min, 2.3-2.5 kw/pound of cheese curd/min, 2.5-2.7 kw/pound of cheese curd/min, 2.7-2.9 kw/pound of cheese curd/min, 2.9-3.1 kw/pound of cheese curd/min, 3.1-3.3 kw/pound of cheese curd/min, 3.3-3.5 kw/pound of cheese curd/min, 3.5-3.7 kw/pound of cheese curd/min, 3.7-3.9 kw/pound of cheese curd/min, 3.9-4.1 kw/pound of cheese curd/min, 4.1-4.3 kw/pound of cheese curd/min, 4.3-4.5 kw/pound of cheese curd/min, 4.5-4.7 kw/pound of cheese curd/min, 4.7-4.9 kw/pound of cheese curd/min, 4.9-5.0 kw/pound of cheese curd/min, and greater than 5.0 kw/pound of cheese curd/min.

In another embodiment, the disclosure relates to a method for making pasta filata cheese comprising cooking cheese curd contained in a first tubular housing with a microwave energy source contained in a second tubular housing, wherein the amount of energy needed to cook the cheese to the desired end product is selected form the group consisting of: 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 kw/pound of cheese curd/min.

There are some important features of microwave heating that will determine the final temperature and moisture distribution during microwave processing. Any study of microwave heating in moist materials must account for simultaneous heat and moisture diffusion through the material.

Not to be bound by any particular theory, microwave heating can be described by a combined heat and moisture diffusion equation that includes a volumetric heating term associated with the dissipation of microwave energy in the material:

$$\nabla^2 (pM_v + nT) - \frac{\partial}{\partial t}\left\{ \begin{bmatrix} \frac{1}{t_v D_a}\left(1 + \frac{(1-a_v)\sigma\rho_s}{a_v}\right) - \frac{n\rho\sigma L}{pk} \end{bmatrix} pM_v + \begin{bmatrix} \frac{Cp}{k}\left(1 + \frac{\omega L}{C}\right) - \frac{p(1-a_v)\omega\rho_s}{n\tau_v D_a a_v} \end{bmatrix} nT \right\} + \frac{nq}{k} = 0 \quad \text{Equation 1}$$

This can be expressed in a simpler form if $\Omega = pM_v + nT$:

$$\nabla^2 \Omega - \frac{1}{\gamma}\frac{\partial \Omega}{\partial t} + \frac{nq}{k} = 0. \quad \text{Equation 2}$$

The constants of association, p and n, are calculated to satisfy:

$$\frac{1}{\gamma} = \left[\frac{1}{\tau_v D_a}\left(1 + \frac{(1-a_v)\sigma\rho_s}{a_v}\right) - \frac{n\rho\sigma L}{pk}\right] \quad \text{Equation 3}$$
$$= \left[\frac{Cp}{k}\left(1 + \frac{\omega L}{C}\right) - \frac{p(1-a_v)\omega\rho_s}{n\tau_v D_a a_v}\right]$$

Essentially, the combined heat and moisture diffusion coefficient (γ) has two independent values, implying that heating and moisture movement occurs in two independent waves. The slower wave of the coupled heat and moisture system is always slower than either the isothermal diffusion constant for moisture or the constant vapor concentration diffusion constant for heat diffusion, whichever is less, but never by more than one half. The faster wave is always many times faster then either of these independent diffusion constants.

The fast heat and moisture diffusion wave has a profound effect on biological materials during microwave heating. In particular, very rapid heat and moisture diffusion during microwave heating yields: faster heating compared to conventional heating; and localized steam explosions that may rupture biological material.

Other important phenomena associated with microwave heating include: non-uniform heat and moisture distribution due to the geometry of the microwave applicator and the geometry of the heated material: and phenomenon such as thermal runaway, which manifest itself as localized "hot spots," and very rapid rises in temperature. The volumetric heating term (q) in equation (1) is strongly influenced by the geometry of the heated material. The equation for electromagnetic power distribution generated in a slab of thickness (W) can be described by:

$$q = \tfrac{1}{2}\omega\varepsilon_o\kappa''(\tau E)^2\{e^{-2\beta z} + \Gamma^2 e^{-2\beta(W-z)} + 2\Gamma e^{-\beta(W-2z)}\cos(\delta + 2\alpha z)\} \quad \text{Equation 4}$$

Using this volumetric heating relationship, the solution for equation (1) is:

$$\Omega(t) = \frac{n\omega\varepsilon_0 \kappa''(\tau E)^2}{8k\beta^2}\{e^{4\gamma\beta^2} - 1\}$$
$$\left\{e^{-2\beta z} + \left(\frac{h}{k} + 2\beta\right)ze^{\frac{-r^2}{4\gamma t}}\right\}(1 + \Gamma^2 e^{-2\beta W}) \quad \text{Equation 5}$$

From this it can be deduced that the temperature/moisture profiles in thick slabs and rectangular blocks usually result in subsurface heating where the maximum temperature is slightly below the material surface.

The microwave's electric held distribution in the radial dimension of a cylinder can be described by:

$$|E| = \tau E_0 \frac{l_0(\beta r)}{l_0(\beta r_0)} \quad \text{Equation 6}$$

The resulting solution to equation (1) can ultimately be derived:

$$\Omega(t) = \frac{n\omega\varepsilon_0\kappa^a\tau^2 E_0^2(e^{4\beta^2\gamma t}-1)}{4k(\beta^2)l_0(2\beta r_0)}\left[\frac{4\alpha\gamma t}{[l_0(\alpha r_0)l_0(\beta r_0)]^2}e^{\frac{-r^2}{4\gamma t}} + l_0(2\beta r) + \left\{2\beta l_1(2\beta r_0) + \frac{h}{k}l_0(2\beta r_0)\right\}(r_0 - r)e^{\frac{-(r_0-r)^2}{4\gamma t}}\right] \quad \text{Equation 7}$$

The temperature/moisture profiles in small-diameter cylinders, usually exhibit pronounced core heating. On the other hand, temperature profiles in large cylinders exhibit subsurface heating, with the peak temperature occurring slightly below the surface.

$$E = \tau E_0 \frac{l_0(fr)}{l_0(fr_0)} \quad \text{Equation 8}$$

The resulting solution to equation (2) can ultimately be derived:

$$\Omega(t) = \frac{n\omega\varepsilon_0\kappa^a\tau^2 E_0^2(e^{4\beta^2\gamma t}-1)}{k\beta \cdot l_0(2\beta r_0)}\left[\frac{\alpha\gamma t}{[j_0(\alpha r_0)l_0(\beta r_0)]^2}e^{\frac{-r^2}{4\gamma t}} + \frac{l_0(2\beta r)}{4\beta} + \left\{2\beta \cdot l_1(2\beta r_0) + \frac{h}{k}l_0(2\beta r_0)\right\}\frac{(r_0-r)}{4\beta}e^{\frac{-(r_0-r)^2}{4\gamma t}}\right] \quad \text{Equation 9}$$

This analysis can aid in understanding how microwave hearing affects biological and food products.

2. Radio Frequency (RF) Energy

In one embodiment, the disclosure related to a method of making pasta filata cheese comprising heating/cooking and/or melting cheese curd using energy from an RF energy source, wherein the RF energy source is contained within a tubular housing.

In one embodiment, the disclosure relates to a method comprising heating dairy product using energy from an RF energy system. In one embodiment, the disclosure relates to a method comprising heating dairy product using RF energy.

In one embodiment, the dairy product is curd. In yet another embodiment, the dairy product is cheese curd.

In one embodiment, the disclosure relates to a method of making pasta filata cheese comprising heating cheese curd using energy from an RF energy system. In one embodiment, the disclosure relates to a method of making pasta filata cheese comprising heating cheese curd contained in a first tubular housing using RF energy, wherein the RF energy source is located within a second housing, and further wherein at least a portion of the second housing surrounds at least a portion of the first housing. In another embodiment, the method further comprises stretching the cooked or melted cheese curd through the use of augers.

In yet another embodiment, the disclosure relates to a method of making pasta filata cheese comprising: (a) creating a uniform shape, size, volume, and/or profile of cheese curd, and (b) heating cheese curd contained with a first tubular housing using RF energy, wherein the RF energy source is contained with a second tubular housing, and further wherein at least a portion of the first tubular housing passes through at least a portion of the second tubular housing. In another embodiment, at least a portion of the second tubular housing surrounds at least a portion of the first tubular housing.

In one embodiment, creating a uniform shape, size, volume, and/or profile of cheese curd comprises leveling the cheese.

In still another embodiment, the disclosure relates to a method of making pasta filata cheese comprising: (a) leveling cheese curd to create a uniform heating profile, and (b) heating cheese curd contained within a first housing using RF energy, wherein the RF energy source is located within a second housing. In one embodiment, the RF energy source is contained with a tubular housing. In one embodiment, at least a portion of the first housing passes trough at least a portion of the second housing.

RF energy is another name for radio waves. It is one form of electromagnetic energy which consists of waves of electric and magnetic energy moving together (radiating) through space. The area where these waves are found is called an electromagnetic field.

Radio waves are created due to the movement of electrical charges in antennas. As they are created, these waves radiate away from the antenna at the speed of light. Waves are measured by: (1) the distances covered by one cycle of the wave (wavelength); and (2) the number of waves that pass a certain point in one second (frequency).

The frequency of an RF signal is usually expressed in units called hertz (Hz):

One Hz equals one wave per second.

One kilohertz (kHz) equals one thousand waves per second

One megahertz (MHz) equals one million waves per second

One gigahertz (GHz) equals one billion waves per second.

RF energy includes waves with frequencies ranging from about 3000 waves per second (3 kHz) to 300 billion waves per second (300 GHz). Microwaves are a subset of radio waves that have frequencies ranging from around 300 million waves per second (300 MHz) to three billion waves per second (3 GHz).

The RF spectrum is divided into several ranges, or bands. With the exception of the lowest-frequency segment, each band represents an increase of frequency corresponding to an order of magnitude (power of 10). Table 1 depicts the eight bands in the RF spectrum, showing frequency and bandwidth ranges. The SHF and EHF bands are open referred to as the microwave spectrum.

TABLE 1

Bands within the RF Spectrum

| Designation | Abbreviation | Frequencies | Free-space Wavelengths |
|---|---|---|---|
| Very Low Frequency | VLF | 9 kHz-30 kHz | 33 km-10 km |
| Low Frequency | LF | 30 kHz-300 kHz | 10 km-1 km |
| Medium Frequency | MF | 300 kHz-3 MHz | 1 km-100 m |
| High Frequency | HF | 3 MHz-30 MHz | 100 m-10 m |
| Very High Frequency | VHF | 30 MHz-300 MHz | 10 m-1 m |
| Ultra High Frequency | UHF | 300 MHz-3 GHz | 1 m-100 mm |
| Super High Frequency | SHF | 3 GHz-30 GHz | 100 mm-10 mm |
| Extremely High Frequency | EHF | 30 GHz-300 GHz | 10 mm-1 mm |

In one embodiment, RF heating comprises heating with electromagnetic field at frequencies from about 1 MHz to about 100 MHz. In yet another embodiment, the RF-energy is within the range of frequencies from about 5 MHz to 50 MHz. In still another embodiment, the RF energy is within the range of frequencies from about 10 MHz to about 30 MHz. The RF-energy can be used at any frequency that provides uniform and consistent heating of the cheese curd.

In one embodiment, RF signals having a fundamental frequency in the high frequency (HF) range (3-30 MHz) of the RF range might be suitable for the systems and methods described herein. Similarly, RF signals having a fundamental frequency in the very high frequency (VHF) range (30-300 MHz) of the RF range may also be suitable for the systems and methods described herein.

In another embodiment, RF signals at any fundamental frequency may also have harmonic components that are multiples of the fundamental frequency of frequencies. Also, RF signals at any fundamental frequencies or periodic multiples of such fundamental frequencies that are harmonies of a fundamental frequency may be selected such that the frequency is the same as or has overlap with (either partially or completely) specific RF frequencies capable of stimulating or exciting any of the various electron energy levels of any of the various species, such as salt species, within the dairy product, including but not limited to cheese curd.

In still another embodiment, the RF signal used may be a pulsed, modulated FM RF signal, or a pulse fixed frequency signal. A pulsed signal may permit a relatively higher peak-power level) e.g., a single "burst" pulse at 100 Watts or more, or a 100 Watt signal having a duty cycle of about 10% to about 25%) and may create higher local temperatures. For example, the RF pulse may be a square wave, or may be a sine wave, or may have a sharp rise time with an extended ringing effect at base line, or may have a slow rise time and a fast decay, etc.

Pulsed RF signal (and other shaped RF signals) may produce very localized temperatures that are higher for a length of time on the order of about a millisecond or longer. For example, a short 5 kilowatt RF pulse of less than a second, e.g., on the order of microseconds (e.g., 3-4 microseconds) may be sufficient to raise the temperature of the mixture sufficiently to achieve the desired effect.

In one embodiment, the RF energy is combined with a second source of heat including but not limited to infrared, microwave, induction, or convection heating. In one embodiment, the second source of heat is microwave energy.

Figure 2:
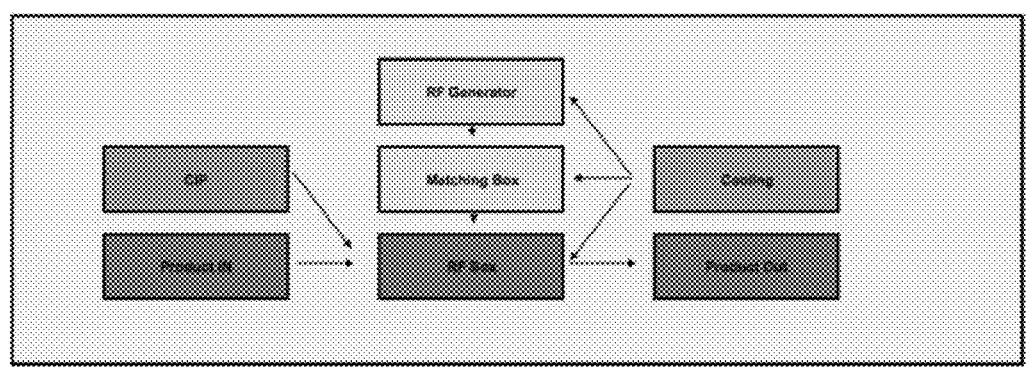
FIG. 2 provides a flow chart of the cooking process using an RF energy generator.
Figure 3:
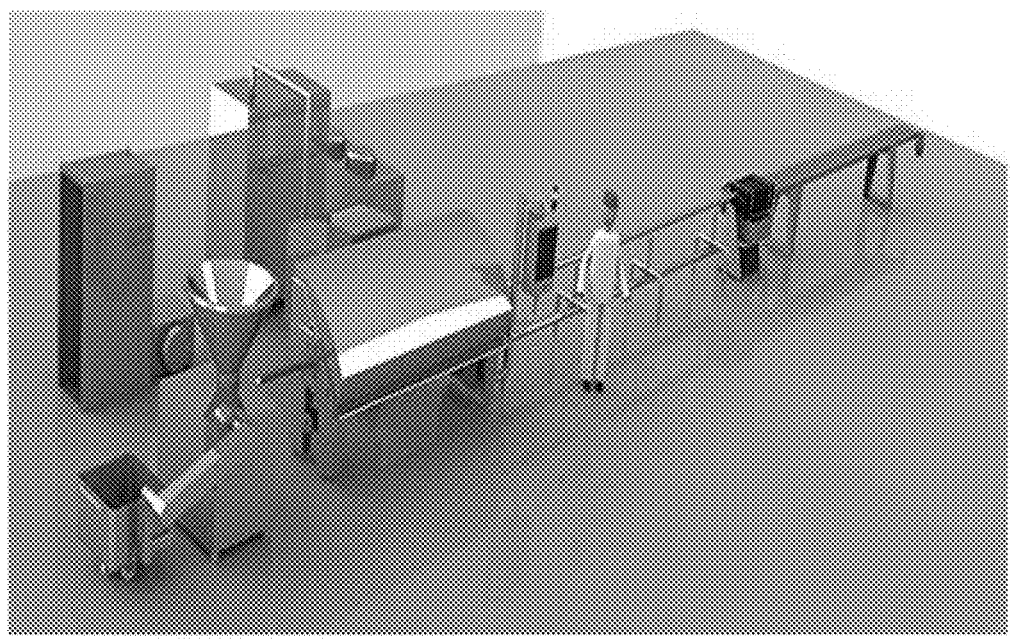
FIG. 3 provides a representative depiction of an RF energy generator from RF Food Systems.

In one embodiment, the RF energy generator is from RF Food Systems (http://rffoodsystems.com/en/scheme-rf-installatie-en: the Netherlands). FIG. 2 provides a flow chart of the cooking process using an RF energy generator. Product, including but not limited to cheese curd, enters the cooking chamber, referred as an RF box by the RF Food Systems. Energy is supplied by the RF generator, which is channeled through a matching box to help control the amount of energy applied. Product exits the cooking chamber and is allowed to cool. In some embodiments, the cheese curd exits the cooking chamber and enters a stretcher FIG. 3 provides a representative depiction of an RF energy generator from RF Food Systems.

In another embodiment, the RF energy generator is one of the products available from Radio Frequency Co. (http://www.radiofrequency.com/products/index.html: Massachusetts).

Additional examples of RF energy generators include, but are not limited to, COSMOS Model C10X16G4 (Cosmos Electronic Machine Corporation, Farmingdale, N.Y.).

In one embodiment, the RF energy is delivered to the dairy product, including but not limited to cheese curd, by one or more electrodes. In one embodiment, there is direct contact between at least one RF electrode and the cheese curd. In another embodiment, there is not contact between any of the RF electrode and the cheese curd.

In one embodiment, the RF electrodes are in direct contact with the surface of the cheese curd when the RF energy is added. In another embodiment, the RF electrodes are not in contact (e.g., from about 1 mm to about 1 cm from the surface of the cheese curd) during the addition of the RF energy.

In still another embodiment, compositions comprising RF absorption enhancers may be used in conjunction with the dairy product, including but not limited to cheese curd, to enhance the effects of the RF energy e.g., enhanced heating, enhanced, combustion, enhanced desalination, etc. The composition comprising the RF absorption enhancers and the dairy product would not intermix, but rather, would be placed in close proximity to one another so that the dairy product receives the benefit of the RF absorption enhancer.

In one embodiment, the RF absorption enhancers may be particles made from RF absorbing materials that absorb one or more frequencies of an RF electromagnetic signal substantially more than other materials. This may permit the RF signal to heat dairy product, which has RF absorbing enhancers in close proximity, more than it would dairy product that does not contain additional RF absorption enhancers.

Exemplary RF absorption enhancers include particle of electrically conductive material, such as silver, gold, copper, magnesium, iron, any of the other metals, and/or magnetic particles, or various combinations and permutations of gold, iron, any of the other metals, and/or magnetic particles. Examples of other RF absorption enhancers include: metal tubules (such as silver or gold nanotubes or silver or gold microtubes, which may be water-soluble), particles made of piezoelectric crystal (natural or synthetic), particles made of synthetic materials, particles made of biologic materials, robotic particles, particles made of man-made applied materials, like organically modified silica (ORMOSIL) nanoparticles.

Examples of yet other RF absorption enhancers that may be useful include RF absorbing carbon molecules and compounds: fullerenes (any of a class of closed hollow aromatic carbon compounds that are made up of twelve pentagonal and differing numbers of hexagonal faces), carbon nanotubes, other molecules or compounds having one or more graphene layers, and other RF-absorbing carbon molecules and compounds e.g., C60 (also known as a "buckyball" or a "buckminsterfullerene"), C70, C76, C84, buckytubes (single-walled carbon nanotubes, SWNTs), multi-walled carbon nanotubes (MWNTs), and other nano-sized or micro-sized carbon cage molecules and compounds. Such carbon-based particles may be in water-soluble form. Such carbon-based particles may have metal atoms (e.g., nickel atoms) integral therewith, which may affect their ability to absorb RF energy and heat in response thereto. Any of the foregoing (and subsequently listed) particles may be sized as so-called "nanoparticles" (microscopic particles whose size is measured in nanometers, e.g., 1-1000 nm) or sized as so-called "microparticles" (microscopic particles whose size is measured in micrometers, e.g., 1-1000 μm).

Additionally, RF absorbing carbon molecules and compounds may be fabricated as RF absorption enhancers to be particles with non-linear I-V characteristics (rectifying characteristics) and/or capacitance. Such non-linear I-V characteristics may result from, for example, nanotubes with a portion doped (e.g., by modulation doping) with a material giving n-type semiconducting properties adjacent a portion doped with p-type semiconducting properties to form a nanotube having an integral rectifying p-n junction. In the alternative, nanotubes can be fabricated with an integral Schottky barrier. In either case, it may be helpful to use nanotubes having at least two conducting regions with a rectifying region therebetween. Accordingly, rectifying circuits for RF absorbing particles for RF absorption enhancers may be fabricated from RF absorbing carbon molecules and compounds having non-linear I-V characteristics.

Any of the RF absorption enhancers described herein may be used alone or in virtually any combination of and/or permutation of any of the particle or particles described herein. For example, it may be beneficial to use a plurality of different RF absorbing particles described herein for purposes of tuning the reactions kinetics of the various methods herein described. Accordingly, virtually any combination or permutation of any RF absorbing particle described herein to create RF absorption enhancers for use in accordance with the teachings herein.

B. Product Leveling

In one embodiment, the disclosure relates to a method comprising (a) creating a uniform heating profile for a dairy product and (b) heating the dairy product of step (a) using electromagnetic energy.

In one embodiment, the disclosure relates to a method comprising (a) creating a uniform heating profile for a dairy product; (b) using one or more sensor to determine if the dairy product has a uniform heating profile; and (c) heating dairy product contained with a first housing using electromagnetic energy, wherein the electromagnetic energy source is contained within a second housing. In one embodiment, a portion of the second housing surrounds at least a portion of the first housing. In yet another embodiment, the first and/or second housing is a tube or tube-like structure.

In one embodiment, the disclosure relates to a method comprising (a) creating a uniform shape, size or volume of a dairy product; (b) using one or more sensor to determine if the dairy product has a uniform heating profile, and (c) heating the dairy product using electromagnetic energy, wherein the electromagnetic energy source is contained within a tubular housing.

In one embodiment, the disclosure relates to a method comprising (a) manipulating a dairy product to a desired shape, size, or volume; (b) using one or more sensor to determine if the dairy product has a uniform heating profile, and (c) heating the dairy product contained with a first tubular housing using electromagnetic energy, wherein the electromagnetic energy source is contained within a second tubular housing. In one embodiment, a portion of the first tubular housing is surrounded by a portion of the second tubular housing.

In one embodiment, the disclosure relates to a method comprising leveling dairy product to create a uniform heating profile; and heating leveled dairy product contained in a first housing using electromagnetic energy contained in a second housing, wherein at least a portion of the second housing surrounds at least a portion of the first housing.

In yet another embodiment, the disclosure relates to a method comprising leveling cheese curd to create a uniform heating profile; and heating the cheese curd using electromagnetic energy.

In one embodiment, leveling the dairy product or cheese curd comprises using an auger. In yet another embodiment, leveling the dairy product or cheese curd comprises using an auger with a combination of flights and paddles to distribute the dairy product or cheese curd across the width of a platform. In one embodiment, the platform is a conveyor belt.

In one embodiment, the disclosure relates to a method comprising leveling dairy product; using one or more sensors to determine if the dairy product has a uniform heating profile, and heating the dairy product using electromagnetic energy. In one embodiment, the dairy product is cheese curd.

In one embodiment, the disclosure relates to a method comprising (a) leveling dairy product to a desired shape, size, or volume; (b) using one or more sensors to determine if the dairy product of step (a) has a uniform heating profile, and (c) heating the dairy product from step (b) in a first housing using electromagnetic energy, wherein the electromagnetic energy is contained in a second housing, and further wherein at least a portion of the second housing surrounds at least a portion of the first housing.

In yet another embodiment, the disclosure relates to a method comprising leveling cheese curd to create a uniform heating profile; using one or more sensors to determine if the dairy product has a uniform heating profile; and heating the cheese curd using microwave energy. In one embodiment, the sensor is a 3D sensor.

In one embodiment, the dairy product is cheese curd.

C. Conveyance System

In one embodiment, the disclosure relates to a method for producing pasta filata cheese comprising transporting cheese curd on a conveyance system to an electromagnetic energy source contained in a tubular housing and cooking and/or melting cheese curd using energy from the electromagnetic energy source.

In another embodiment, the disclosure relates to a method for producing pasta filata cheese comprising transporting cheese curd on a belt system to a first tubular housing, and cooking and/or melting cheese curd using energy from an electromagnetic energy source contained in a second tubular housing. In one embodiment, the first tube is encapsulated within the second tube, employing a tube-within-a-tube design. In other words, a portion of the second tube surrounds a portion of the first tube. In another embodiment, the method further comprises stretching the cooked or melted cheese curd through the use of augers.

In still another embodiment, belt system is set at a rate selected from the group consisting of 0.001-5 in/min, 5-10 in/min, 10-15 in/min, 15-20 in/min, 20-25 in/min, 25-30 in/min, 30-35 in/min, 35-40 in/min, 40-45 in/min, 45-50 in/min, 50-55 in/min, 55-60 in/min 60-65 in/min, 65-70 in/min, 70-75 in/min, and greater than 75 in/min.

In still another embodiment, belt system is set at a rate selected from the group consisting of: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 66, 67, 68, 69, 70, 71, 72, 73, 74, and 75 in/min.

In yet another embodiment, the disclosure relates to a method for producing pasta filata cheese comprising (a) conveying cheese curd to a cyclone; (b) transporting cheese curd from the cyclone to a first tubular housing; and (c) heating cheese curd in the first tubular housing using energy from an electromagnetic energy source contained within a second tubular housing. In another embodiment, the method further comprises (d) stretching the heated cheese curd through the use of augers. In one embodiment, the cheese curd is transported from the cyclone to the electromagnetic energy source with a conveyance system. In one embodiment, the conveyance system is a mechanical belt system.

In one embodiment, the first tube is encapsulated within the second tube, employing a tube-within-a-tube design. In other words, a portion of the second tube surrounds a portion of the first tube.

In another embodiment, the disclosure relates to a method for producing pasta filata cheese comprising (a) air conveying cheese curd to a cyclone; (b) dispensing dry ingredients into the cheese curd after delivery to the cyclone, (c) transporting cheese curd from step (b) into a first tubular housing; and (d) heating cheese curd using energy from an electromagnetic energy source contained with a second tubular housing. In another embodiment, the method further comprised (e) stretching the cooked or melted cheese curd through the use of augers or pumps. In another embodiment, the method further comprises transporting the cheese curd from cyclone to the microwave system using a belt system.

In another embodiment, the disclosure relates to a method for producing pasta filata cheese comprising (a) air conveying cheese curd to a cyclone, (b) milling cheese curd from the cyclone (c) dispensing dry ingredients into the cheese curd after milling, (d) transporting cheese curd from step (c) into a first tubular housing; and (e) heating the cheese curd in the first tubular housing using energy from an electromagnetic energy source contained within a second tubular housing. In one embodiment, at least a portion of the second tubular housing surrounds at least a portion of the first tubular housing. In one embodiment, the length of the first tubular housing extends beyond the length of the second tubular housing in at least one direction. In one embodiment, the length of the first tubular housing extends beyond the length of the second tubular housing in both directions.

In another embodiment, the method further comprises (f) stretching the cooked or melted cheese curd through the use of augers. In still another embodiment, the cheese curd is transported using a mechanical belt system.

D. Tubular Housing Containing an Electromagnetic Energy Source

In one embodiment, the disclosure relate to a method for making pasta filata cheese comprising heating cheese curd contained with a first tubular housing with an electromagnetic energy source contained within a second tubular housing. In another embodiment, the cheese surd is exposed to the electromagnetic energy source for a period of time selected form the group consisting of 5-10, 10-15, 15-20, 20-25, 25-30, 30-35, 35-40, 40-45, 45-50, 50-55, 55-60, 60-65, 65-70, 70-75, 75-80, 80-85, 85-90, 90-95, 95-100, 100-110, 110-120, 120-130, 130-140, 140-150, 150-160, 160-170, 170-180, and greater than 180 seconds.

In another embodiment, the cheese curd is exposed to the electromagnetic energy source for a period of time selected from the group consisting of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, and 180 seconds.

In one embodiment, tubular housing containing the electromagnetic energy source can be from about 6 to about 12 inches, from about 12 inches to about 18 inches, from about 18 to about 24 inches, from about 24 inches to about 30 inches, from about 30 inches to about 36 inches, from about 36 inches to about 42 inches, from about 42 inches to about 48 inches, from about 48 inches to about 54 inches, from about 54 inches to about 60 inches, from about 60 inches to about 66 inches, from about 66 inches to about 72 inches, from about 72 inches to about 78 inches, from about 78 inches to 84 inches, from about 84 inches to about 90 inches, from about 90 inches to about 96 inches, from about 96 inches to about 102 inches, from about 102 inches to about 108 inches, from about 108 inches to about 114 inches, from about 114 inches to about 120 inches, and greater than 120 inches in length.

In one embodiment, the tubular housing can contain one or more than one electromagnetic energy source(s). In still another embodiment, the tubular housing can contain 1, 2, 3, 4, 5, 6, 7, 8, 9, 10, 11, 12, 13, 14, and 15 microwave energy sources. In one embodiment, the microwave energy sources can deliver the same amount of energy.

In another embodiment, the electromagnetic energy sources are set to deliver different amounts of energy. In one embodiment, the tubular housing comprises a first electromagnetic energy source and a second electromagnetic energy source. The amount of energy delivered from the first electromagnetic energy source can be greater than the amount of energy delivered from the second electromagnetic energy source and be from 0.01% to 0.01%, from 0.1% to 0.3%, from 0.3% to 0.5%, from 0.5% to 0.7%, from 0.7% to 0.9%, from 0.9% to 1.0%, from 1.0% to 1.5%, from 1.5% to 2%, from 2% to 2.5%, from 2.5% to 3%, from 3% to 3.5%, from 3.5% to 4%, from 4% to 4.5%, from 4.5% to 5%, from 5% to 10%, from 10% to 20%, and greater than 20% of the energy delivered from the second electromagnetic energy source.

In another embodiment, the amount of energy delivered from the second electromagnetic energy source can be greater than the amount of energy delivered from the first electromagnetic energy source and be from 0.01% to 0.01%, from 0.1% to 0.3%, from 0.3% to 0.5%, from 0.5% to 0.7%, from 0.7% to 0.9%, from 0.9% to 1.0%, from 1.0% to 1.5%, from 1.5% to 2%, from 2% to 2.5%, from 2.5% to 3%, from 3% to 3.5%, from 3.5% to 4%, from 4% to 4.5%, from 4.5% to 5%, from 5% to 10%, from 10% to 20%, and greater than 20% of the energy delivered from the first electromagnetic energy source.

E. Temperature of the Cheese Curd

In another embodiment, methods disclosed herein can be used with dairy product of any temperature. In one embodiment, the methods disclosed herein can be used with cheese curd of any temperature. In one embodiment, the cheese curd can be frozen, refrigerated, room temperature, or any temperature above room temperature.

In one embodiment, the temperature of the cheese curd prior to entering the electromagnetic energy source is selected from the group consisting of: 70-110° F., 75-105° F., 80-100° F., and 85-95° F.

In one embodiment, the temperature of the cheese curd prior to entering the electromagnetic energy source is selected from the group consisting of: 70-75° F., 75-80° F., 80-85° F., 85-90° F., 90-95° F., 95-100° F., 100-105° F., and 105-110° F.

In yet another embodiment, the temperature of the cheese curd prior to entering the electromagnetic energy source is selected from the group consisting of: 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, and 110° F.

In yet another embodiment, the temperature of the cheese curd after exiting the electromagnetic energy source is selected from the group consisting of: 110-180° F., 115-175° F., 120-170° F., 125-165° F., 130-160° F., 135-155° F., and 140-150° F.

In yet another embodiment, the temperature of the cheese curd after exiting the electromagnetic energy source is selected from the group consisting of: 100-115° F., 115-120° F., 120-125° F., 125-130° F., 130-135° F., 135-137° F., 137-139° F., 139-141° F., 141-143° F., 143-145° F., 145-150° F., 150-155° F., 155-160° F., 160-170° F., and 170-180° F.

In still another embodiment, the temperature of the cheese curd after exiting the electromagnetic energy source is selected from the group consisting of: 110, 111, 112, 113, 114, 115, 116, 117, 118, 119, 210, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, and 180° F.

Mozzarella produced in the traditional process cooks in water that reaches temperatures of from about 145° to about 180° F. The cheese itself attains internal temperatures ranging from about 125° to about 140° F. The methods disclosed herein using energy from a microwave system produces cheese internal temperatures ranging from about 125° to about 140° F. Higher temperatures may result in longer shelf life of the final cheese.

In another embodiment, heating cheese curds with electromagnetic energy source can raise the temperature of the cheese curds by 5-10° F., 10-15° F., 15-20° F., 20-25° F., 25-30° F., 30-35° F., 35-40° F., 40-45° F., 45-50° F., 50-55° F., 55-60° F., 60-65° F., 65-70° F., 70-75° F., 75-80° F., 80-85° F., 85-90° F., 90-95° F., 95-100° F., 100-105° F., 105-110° F., and 110-115° F.

In another embodiment, the methods disclosed hereto can raise the temperature of the cheese curds using an electromagnetic energy source by 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, and 115° F.

F. pH of the Cheese Curd

In still another embodiment, the pH of the cheese curd prior to entering the electromagnetic energy source is selected from the group consisting of: 4.8-7.0, 4.9-6.9, 5.0-6.8, 5.1-6.7, 5.2-6.6, 5.3-6.5, 5.4-6.4, 5.5-6.3, 5.6-6.2, 5.7-6.1, and 5.8-6.0.

In still another embodiment, the pH of the cheese curd prior to entering the electromagnetic energy source is selected from the group consisting of: 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, and greater than 7.0.

In one embodiment, the pH of the cheese curd prior to entering the electromagnetic energy source is about 5.1-5.5. In still yet another embodiment, the pH of the cheese curd prior to entering the microwave system is about 5.2.

In yet another embodiment, the pH of the cheese curd after exiting the electromagnetic energy source is selected from the group consisting of: 4.1-6.0, 4.2-5.9, 4.3-5.8, 4.4-5.7, 4.5-5.6, 4.6-5.5, 4.7-5.4, 4.8-5.3, 4.9-5.2, and 5.0-5.1.

In yet another embodiment, the pH of the cheese curd after exiting the electromagnetic energy source is selected from the group consisting of: 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, and greater than 6.0.

G. Input Material

Generally, the methods disclosed herein may use with any input material including any type of curd (e.g., curd used in the preparation of a pasta filata cheese). A traditional low-moisture part-skim pasta filata cheese, such as a traditional low-moisture part-skim mozzarella, typically has a target moisture content between about 47% to about 52%, a fat content (on a dry basis) between about 38% to about 42%, a pH about 5.1 to about 5.4, and a salt content between about 1.4% to about 1.9%.

A traditional whole milk pasta filata cheese, such as a traditional whole milk mozzarella cheese, has a target moisture content between about 45% to about 48%, a fat content (on a dry basis) between about 45% to about 48%, a pH about 5.1 to about 5.4, and a salt content between about 1.4% to about 1.9%. If the curd used in the methods disclosed herein for making a low-moisture part-skim mozzarella or a traditional whole milk pasta filata cheese does not have the parameters to produce a cheese within these ranges, various ingredients, well known to the cheese making art, may be added to adjust the curd to within the desired levels.

In another embodiment, the methods disclosed herein can be used with a Type I mozzarella, which contains more than 52% but not more than 60% moisture and not less than 45% milk fat on a dry basis. Salt content is per customer demand but may range from 0.5% to 2% salt.

In another embodiment, the methods disclosed herein can be used with a Type II mozzarella (low-moisture mozzarella), which contains more than 45% but not more than 52% moisture and not less than 45% milk fat on a dry basis.

In another embodiment, the methods disclosed herein can be used with a Type III mozzarella (part-skim mozzarella), which contains more than 52% but not more than 60% moisture and less than 45% but not less than 30% milk fat on a dry basis.

In another embodiment, the methods disclosed herein can be used with a low moisture part skim mozzarella. A low moisture part skim mozzarellas is defined by the USDA as "type IV" and shall contain more than 45% but less than 52% moisture, and less than 45% but not less than 30% milk fat on the dry basis. Salt content is per customer demand but may range from 0.5% to 2% salt.

In another embodiment, the methods disclosed herein can be used with a lite mozzarella cheese, which contains not less than 52% and not more than 60% moisture and not less than 10.8% milk fat on a dry basis.

The methods disclosed herein prepare mozzarella and other pasta filata cheeses that retain the characteristics of the USDA specification for Type I mozzarella, Type II low moisture mozzarella, Type III part skim mozzarella, Type IV low moisture, part skim mozzarella, and lite mozzarella as well as other pasta filata cheeses. The cheeses made by this method include soft (fresh) cheeses, such as mozzarella, and semi-hard cheeses, such as provolone.

The methods disclosed herein may use either a fresh curd or a curd that has aged or cured for up to about two weeks. It is advantageous to use fresh curd, because fresh curd eliminates the step of packaging the intermediate cheese product, before introducing the cheese into the microwave system. Then, only a single packaging step of the final processed mozzarella is necessary.

Some fat may be removed from the liquid milk before making the curd to lower the fat content. Fat may also by removed, or the fat content lowered, by adding non-fat milk solids to the curd during cheese manufacture. However, it may be less expensive to lower the fat content by adding non-fat milk solids, than by removing fat from the milk. Acceptable curd for purposes of the methods disclosed herein has a fat content of about 38% to 48% (dry basis), a moisture content of about 38% to about 48% and a salt level of about 0.8% to about 2.0% when entering the microwave system.

In one embodiment, the methods disclosed herein have obtained suitable results with a curd that has a fat content of about 42% (dry basis), a moisture content of about 43% to about 44% and a determined salt level between 0% to about 1.8% when entering the microwave system.

The desired salt content of the pasta filata cheese, such as mozzarella, made by the methods disclosed herein preferably should equal the salt content of the traditional pasta filata cheese. This is necessary in order for the final cheese to obtain characteristics of taste, body and shelf life equivalent to those of a traditional pasta filata cheese. Salt may be added at various stages of the methods, including but not limited to addition in the whey draining equipment, grinding the curd, mixing with the curd en route to the cyclone, and adding ingredients with an ingredient dispenser. Generally, if the curd entering the cheese grinder has a salt content similar to the level desired for the final cheese, salt need not be added to the curd.

In one embodiment, salt may be added prior to molding or brining. This offers certain advantages such as incorporating salt throughout the cheese block, decreasing yield loss in brine, and providing more uniformity in the product.

In the preparation of a traditional pasta filata, the curd melts in a cooker using hot water. The method disclosed herein uses energy from a microwave system to cook and/or melt the curd. The use of energy from a microwave system to cook and/or melt the curd has several advantages over traditional preparations of pasta filata cheese. Solids loss is avoided or minimized with the inventive method using energy from a microwave system. In the traditional pasta filata preparation, fats and other milk solids are lost in the water used to melt the curd. This loss can amount to from about 0.5% to about 2%. In traditional mozzarella preparation, the product from the cooker goes directly to an extruder (sometimes referred to as a molder), where the melted curd is augered into molds. The product cools in the mold so that it will retain the mold shape when the molded product is pushed out of the mold into salt brine. While the molded cheese product finishes cooling in the brine, salt from the brine soaks into the molded cheese product before packaging.

The pasta filata cheese prepared according to the methods of disclosed herein has body, meltability, stretchability and flavor characteristics of a traditional pasta filata cheese. With regard to mozzarella cheese, the body of mozzarella refers to its appearance upon tearing apart the cooled cheese. The desired body or texture should approximate the stringiness seen in pulling apart cooked chicken breast. Meltability refers to the ability of shredded strands of mozzarella cheese to melt completely and flow together, do individual strands are no longer present. Stretchability refers to the measurement of the melted cheese fibers as they pull upward from the melted mass. Most customers desire stretchability of from about 6 to about 24 inches, cheese made by methods disclosed herein will have the desired stretchability.

The mozzarella cheese made according to the inventive method can be packaged in any sizes common to the cheese industry and according to the customer's needs. Thus, sizes of 1 oz., 8 oz., 12 oz., 16 oz., 5 lbs., 10 lbs., 20 lbs. and 40 lbs., as well as other sizes, may be prepared. Following are examples of making a mozzarella according to the method of this invention.

II. System Making Pasta Filata Cheese

Figure 4:
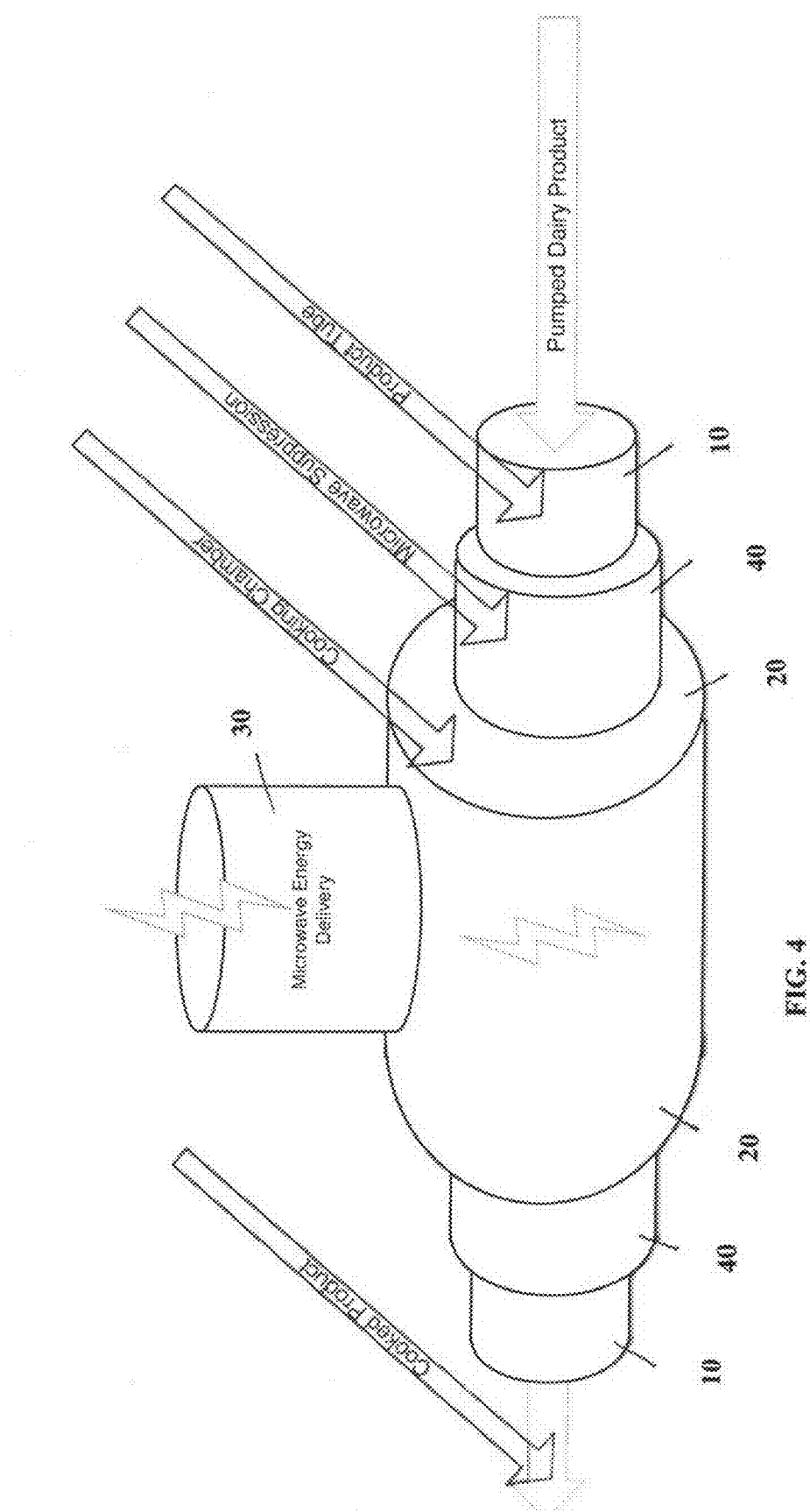
FIG. 4 is a representative depiction of a system for production of pasta filata cheese depicting a tube within a tube design.

Referring now to the drawings, FIG. 4 illustrates an apparatus employing a tube-within-a-tube design for producing cheese of the pasta filata type. A pasta filata type cheese is a cheeses that is cooked and stretched, such as mozzarella, provolone, blends thereof, or a cheese of this type blended with a cheese analog or imitation cheese.

Referring to FIG. 4, a system employing a tube-within-a-tube design for producing pasta filata cheese is shown. A portion of a first tubular housing 10 is contained within a second tubular housing 20. The first tubular housing 10 contains the dairy product ("product tube") and the second tubular housing 20 ("cooking chamber") contains an electromagnetic energy source 30. In FIG. 4, the electromagnetic energy source is a microwave energy source 30. The second tubular housing ("cooking chamber") surrounds a portion of a tubular housing that contains the dairy product ("product tube").

As shown in FIG. 4, the dairy product is pumped into a first tubular housing 10. The dairy product moves through the first tubular housing and is cooked and/or heated by an electromagnetic energy source (shown as microwave energy source) contained in the second tubular housing 20, which surrounds a portion of the first tubular housing. In some embodiments, the second tubular housing surrounds about 20-25%, 25-30%, 30-35%, 35-40%, 40-45%, 45-50%, 50-55%, 55-60%, 60-65%, 65-70%, 70-75%, 75-80%, and greater than 80% of the first tubular housing.

As shown in FIG. 4, portions of the first tubular housing 10 extend beyond the second tubular housing 20 (cooking chamber). In some embodiments, a third tubular housing 40 (shown as microwave suppression) can separate the cooking chamber from the product chamber.

In one embodiment, prior to being pumped into the first tubular housing, the dairy product may be transported to a cyclone. The cyclone can be made of any suitable material including but not limited to stainless steel.

In one embodiment, the cheese curd moves from the cyclone to a curd mill. A curd mill may be used to reduce the size of the curd entering the cyclone. In another embodiment, the curd may be milled prior to being transported to the cyclone. In still another embodiment, a method known as "stirred curd" may be implemented whereby curds are continuously stirred on the why draining machine so that milling is not required.

In one embodiment, the curd mill cuts the cheese to a pre-determined and desired size. Representative sizes include but are not limited to $3/8"\times3/8"\times4"$; $3/4"\times3/4"\times2"$ and many other sizes.

The cheese curd leaves the curd mill and is pumped into the first tubular housing. In one embodiment, cheese curd from the curd mill is deposited onto a section of conveyor belt, designed to give the curd mass a specific width, length, and height. This conveyor belt may have cleats across its width and may have elevated sides to contain the curd.

In one embodiment, the system can include at least one conveyance system for transporting the articles through one or more of the processing zones described herein. Examples of suitable conveyance systems can include, but are not limited to, plastic or rubber belt conveyors, chain conveyors, roller conveyors, flexible or multiflexing conveyors, wire mesh conveyors, bucket conveyors, pneumatic conveyors, screw conveyors, trough or vibrating conveyors, and combinations thereof. The conveyance system can include any number of individual convey lines and can be arranged in any suitable manner within the process vessels. The conveyance system can be configured in a generally fixed position within the vessel or at least a portion of the system can be adjustable in a lateral or vertical direction.

In one embodiment, a mechanical belt system is used to transport the cheese from one station to the next station in the system. The cheese curd can be transported on the belt at a rate selected from the group consisting of: 5-10 in/min, 10-15 in/min, 15-20 in/min, 20-25 in/min, 25-30 in/min, 30-35 in/min, 35-40 in/min, 40-45 in/min, 45-50 in/min, 50-55 in/min, 55-60 in/min, 60-65 in/min, 65-70 in/min, 70-75 in/min, and greater that 75 in/min. In one embodiment, the belt operates at a rate of 48 in/min.

In one embodiment, a mechanical belt transports the cheese curd from the mill to as ingredient dispenser. Various ingredients known to the cheese-making art may be added to achieve the optimum characteristics in the final cheese. Examples of such ingredients include but are not limited to non-fat dry milk, anhydrous milk fat, milk protein concentrate, concentrated milk fat, emulsifier, salt, water, and other ingredients as allowed by current or future standards, and mixtures thereof. For example, addition of non-fat dry milk solids lowers the fat content of the cheese, based on the desired specifications of the finished cheese. Adding non-fat dry milk solids is one way to standardize the fat content of the cheese and to capture more of the nonfat solids. The cheese curd takes up re-hydrated nonfat dry milk more easily and the final cheese avoids watering-off. The fat and water content of the incoming cheese and of the desired final cheese determine the amount of such ingredients to be added. Often, these ingredients may be functionally interchangeable, and the particular added ingredient may vary according to the desired characteristics of the cheese product and according to the market availability and cost of these ingredients.

If desired, a suitable emulsifier may be added to the curd before it is cooked in the microwave system. In another embodiment, the emulsifier may be added prior to entering the microwave system, after exiting the microwave system or before entering the microwave system and after exiting the microwave system.

Non-limiting examples of suitable emulsifiers include sodium citrate and sodium phosphate, in amounts of between less than about 0.5% to about 3% (the maximum amount allowed by law). If the curd has the correct fat and moisture content when introduced into the microwave system, an emulsifier is generally unnecessary. However, to meet certain customer needs, it may be desirable to adjust the moisture or add additional ingredients to the cheese. In addition, an emulsifier avoids watering-off of the mozzarella, by allowing absorption of added water. When an emulsifier, such as sodium citrate, is added, it is preferably added in a level under 0.5%.

Traditional mozzarella preparation typically uses thermophilic cultures and such cultures may be used in the methods disclosed herein.

Additional examples of ingredients include but are not limited to acidity regulator, an acid, an anticaking agent, and antifoaming agent, a coloring agent, and emulsifier, an enzyme preparation, a flavoring agent, a finning agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetable, nuts, meat, and spices, among other foodstuffs.

Acidity regulators, anticaking agents and firming agents of various types can be included in the soft or firm/semi-hard ripened or unripened blended cheese. Typically, these agents are inorganic salts, but other types of acidity regulators, anticaking agents and firming agents may include calcium chloride, triacalcium phosphate, and calcium hydroxide, powdered cellulose, disodium phosphate and potassium hydroxide. These agents are typically added as part of a solution, either by incorporation in the slurry or as a liquid. But they can also be added as a powder that is incorporated, for example, into the admixture of the slurry and heated cheese mass at the mixing stage.

The total amount of acidity regulators, anticaking agents and firming agents incorporated is sufficient so the concentration of the acidity regulators, anticaking agents and firming agents in the final cheese product is generally up to about 0.01, 0.5, or 3.0% by weight. More specifically, the amount of acidity regulators, anticaking agents and firming agents can range from about 0.05-3.0%, from about 0.1-2.5%, or from about 0.5-2.0% by weight. This means that the concentration of the acidity regulators, anticaking agents and firming agents in the slurry is typically about 0.01-3.2%.

A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, and potassium phosphate), calcium citrate, trisodium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight. The concentration of the sequestrants in the slurry itself is typically about 0.1 to about 12% by weight of the slurry.

An acidic agent (an acid) can be incorporated to adjust the pH of the finished cheese to a desired level. The acidity of the cheese can be controlled to help regulate the melt down characteristics of the finished cheese. Various acids can be employed; examples of suitable acids include, but are not limited to, adipic acid, lactic acid, hydrochloric acid, acetic acid, glucano delta lactone, phosphoric acid, lactobionic acid or Genlac C, the latter being a blend of water, citric acid, lactic acid, acetic acid and artificial flavors. Acid is typically added to adjust the pH of the finished cheese to a pH from about 5-6 is reached, and more typically from pH 5.10-5.90.

A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red, an artificial color such as FD&C red #40 can be used. Annatto is useful to give mozzarella cheese the appearance of cheddar. This allows one to produce a cheese for pizza baking that has the desired melt characteristics of mozzarella, but with a different appearance than that of traditional white mozzarella. Annatto-colored mozzarella can be used as a replacement for cheddar cheese in many food products (e.g., Mexican-style prepared foods). Tumeric imparts a yellowish color to cheese. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Various flavoring agents can also be incorporated into the cheese to tailor the flavor profile of the cheese to meet consumer preferences. Suitable flavors for mixing into the heated cheese include, for example, cheddar cheese flavor and parmesan cheese flavor. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

The cheese curd is pumped from the ingredient dispenser to the first tubular housing. The cheese curd move through the first tubular housing and is cooked where the first tubular housing and the second tubular housing overlap. The cheese curd in heated using microwave energy contained in a second tubular housing. The cheese curd is cooked while it moves past the second tubular housing.

During the microwave treatment, the water molecules contained in the cheese evaporate very easily, also thanks to the very high specific surface area of the product. In this way, it is possible to control the supply of energy so that the organoleptic and nutritional properties of the product are not damaged in any way.

Any microwave system that provides continuous and uniform heating can be used. Sources of microwave energy are available from a variety of industrial microwave manufacturers.

In one embodiment, the microwave system may contain an exhaust vent to dispel excess heat.

A microwave system will first raise the temperature of water-phase and with it the water soluble enzymes. This results in more efficient denaturation of the proteolytic enzymes. This reduction of the residual enzymes in more moderate protein breakdown.

Returning to FIG. 4, the cheese curd moves through the first tubular housing 10, wherein at least a portion of the first tubular housing is encapsulated by the second tubular housing 20 containing the electromagnetic energy source 30 (shown as microwave energy source) and can be transported by a belt to mechanical augers, which stretch the cooked and/or melted cheese curd. In the methods and systems disclosed herein, the lowest possible auger speed assures even mixing and melting of the curd without lowering the fat and moisture content to below that desired for the final mozzarella cheese. The auger speed for the methods disclosed herein can be lowered. In one embodiment, the auger speeds range from about 6 to about 26 RPM. Higher speeds tended to mash the curd together and to squeeze out needed fat and moisture. A low auger speed will aid in mixing and melting of the curd without lowering the fat and moisture content to below that desired for the final pasta filata cheese.

Finally, the mechanical belt can be cleaned by a Clean-In-Place system, which contains various detergents and agents for removing any residual cheese pieces. After the belt is exposed to the detergents, at least one rinse is performed with clean water to ensure no detergents remain on the belt. One of ordinary skill in the art will understand how to optimize and customize the Clean-In-Place system to ensure that residual cheese flakes and/or parts re removed and at the same time, no residual detergent remains on the belt.

General Procedure for Production of Cheese Curd

A general and representative procedure for the production of cheese curs is provided below. The information below is not intended to limit the scope of the application in any manner.

Starting from cow's milk or buffalo milk, or mixed milk having a 0-10% fat content and 2.5-5% protein content, after filtration, the milk is optionally pasteurized following usual procedures or submitted to ultrafiltration, microfiltration and other similar procedures. Once the milk source characteristics have been determined, the milk is brought to a temperature of 33°-37° C. Then the addition of cultures of bacteria and/or selected ferments is carries out, which operation generally takes place 20-30 minutes before the addition of rennet so as to give the milk a mass of very active microorganisms that can give fermentation the desired orientation at once.

Generally, cultures of bacteria mainly consisting of *Streptococcus thermophilus* and a minor part of *Lactobacillus helveticus* or *Lactobacillus bulgaricus* are used. The acidity of said bacteria cultures added to the milk at the rate of 2-3%, ranges from 14° to 24°SH/50 ml. It is however also possible to act in such a manner that the acidifying action carried out by milk ferments is replaced by the addition of organic acids to the milk. This addition must take place in such a way to avoid concentration gradients that can five rise to the formation of flocculations. It is therefore suitable to undertake a slow addition of acids suitably diluted in water to the milk remaining under constant and quick stirring. Acetic acid of citric acid may be considered as appropriate and the pH value ranges from 5.5 to 5.8.

Next, to the milk thus obtained, rennet of various titre and characteristics and in variable doses is then added. Curdling takes place at a temperature of about 33°-37° C., it requires a period of time of about 45 minutes and enables a soft but elastic curd to be achieved. In any case, rennet amount and curdling temperature and time may vary depending on the milk characteristics and of the particular features to be achieved in the finished product.

After the soft gel (curd) hardening step, the curd can be cut. The first cutting together with a short rest (5 to 10 minutes) enables the whey drain off to start. Then there is a second cutting. The final result is a curd suspension consisting of grains of variable size depending upon the desired final product. Eventually, the curd may be allowed to settle on the cheese vat bottom in order to enable it "to build itself up" and start ripening.

The disclosure is now described with reference to the following Examples. These Examples are provided for the purpose of illustration only and the invention should in no way be construed as being limited to these Examples, but rather should be construed to encompass any and all variations that become evident as a result of the teaching provided herein. All references including but not limited to U.S. patents, allowed U.S. patent applications, or published U.S. patent applications are incorporated within this specification by reference in their entirety.

What is claimed is:

1. A method for making pasta filata cheese comprising:
    flowing a dairy product through a product tube, wherein the dairy product comprises cheese curds;
    heating the dairy product within a cooking portion of the product tube within a cooking chamber by applying electromagnetic energy to said dairy product within said cooking portion of the product tube from an electromagnetic energy source through an energy suppression tube which suppresses the electromagnetic energy from the electromagnetic energy source, wherein the energy suppression tube surrounds the cooking portion of the product tube, and the cooking chamber surrounds a portion of the energy suppression tube such that said electromagnetic energy passes through said portion of the energy suppression tube to reach the dairy product within said cooking portion of the product tube; and
    collecting a heated dairy product from the product tube.

2. The method of claim 1, further comprising leveling the dairy product prior to flowing the dairy product through the product tube.

3. The method of claim 2, wherein leveling is performed using an auger.

4. The method of claim 1, wherein the electromagnetic energy comprises microwave energy, wherein the power rate of the microwave energy is selected from the group consisting of:
    from about 30 kw to about 300 kw, from about 40 kw to about 290 kw, from about 50 kw to about 280 kw, from about 60 kw to about 270 kw, from about 70 kw to about 260 kw, from about 80 kw to about 250 kw, from about 90 kw to about 240 kw, from about 100 kw to about 230 kw, from about 110 kw to about 220 kw, from about 120 kw to about 210 kw, from about 130 kw to about 200 kw, from about 140 kw to about 190 kw, from about 150 kw to about 180 kw, and from about 160 kw to about 170 kw.

5. The method of claim 4, wherein the power rate of the microwave energy is from about 30 kw to about 300 kw.

6. The method of claim 4, wherein the power rate of the microwave energy is from about 50 kw to about 280 kw.

7. The method of claim 1, wherein the electromagnetic energy is microwave energy or radio frequency (RF) energy.

8. The method of claim 1, wherein heating the dairy product by applying electromagnetic energy comprises applying microwave energy with a power rate of about 63 to about 77 kw, and wherein about 5,580 to about 6,820 pounds of dairy product per hour flows through the product tube.

9. The method of claim 1, wherein heating the dairy product by applying electromagnetic energy comprises applying microwave energy with a power rate of about 98 to about 182 kw, and wherein about 8,680 to about 16,120 pounds of dairy product per hour flows through the product tube.

10. The method of claim 1, wherein heating the dairy product by applying electromagnetic energy comprises applying microwave energy with a power rate of about 56 to about 308 kw, and wherein about 5,000 to about 27,280 pounds of dairy product per hour flows through the product tube.

11. A system for making pasta filata cheese comprising:
a product tube comprising a cooking portion;
a cooking chamber;
an electromagnetic energy source, wherein the electromagnetic energy source is adjacent to the cooking chamber; and
an energy suppression tube;
wherein the cooking portion of the product tube is surrounded by the energy suppression tube, and a portion of the energy suppression tube is surrounded by the cooking chamber; and
wherein the electromagnetic energy source is configured to pass electromagnetic energy applied to the cooking chamber through said portion of the energy suppression tube to said cooking portion.

12. The system of claim 11, further comprising a product leveling system configured to supply a dairy product to the product tube.

13. The method of claim 1, wherein the electromagnetic energy is microwave energy, and the heating of the dairy product is performed exclusively with the use of microwave energy.

14. The method of claim 11, wherein the product tube is a straight tube.

15. The method of claim 1, wherein the electromagnetic energy applied to the dairy product is pulsed.

* * * * *